US012568390B2

(12) United States Patent
Wu

(10) Patent No.: US 12,568,390 B2
(45) Date of Patent: Mar. 3, 2026

(54) MANAGING QUALITY OF EXPERIENCE REPORTING AFTER RECOVERING FROM FAILURE

(71) Applicant: GOOGLE LLC, Mountain View, CA (US)

(72) Inventor: Chih-Hsiang Wu, Taoyuan (TW)

(73) Assignee: GOOGLE LLC, Mountain View, CA (US)

( * ) Notice: Subject to any disclaimer, the term of this patent is extended or adjusted under 35 U.S.C. 154(b) by 241 days.

(21) Appl. No.: 18/285,335

(22) PCT Filed: Oct. 5, 2022

(86) PCT No.: PCT/US2022/045788
§ 371 (c)(1),
(2) Date: Oct. 2, 2023

(87) PCT Pub. No.: WO2023/059725
PCT Pub. Date: Apr. 13, 2023

(65) Prior Publication Data

US 2024/0196249 A1 Jun. 13, 2024

Related U.S. Application Data

(60) Provisional application No. 63/252,332, filed on Oct. 5, 2021.

(51) Int. Cl.
*H04W 24/10* (2009.01)
*H04W 36/00* (2009.01)
*H04W 76/27* (2018.01)

(52) U.S. Cl.
CPC ....... *H04W 24/10* (2013.01); *H04W 36/0055* (2013.01); *H04W 76/27* (2018.02)

(58) Field of Classification Search
None
See application file for complete search history.

(56) References Cited

U.S. PATENT DOCUMENTS

2013/0294281 A1 11/2013 Lee et al.
2014/0162656 A1 * 6/2014 Chai ................ H04W 36/0077 455/437

(Continued)

FOREIGN PATENT DOCUMENTS

WO WO-2020/128657 A1 6/2020
WO WO-2021/052321 A1 3/2021

(Continued)

OTHER PUBLICATIONS

International Search Report and Written Opinion for Application No. PCT/US2022/045788, dated Jan. 25, 2023.

(Continued)

*Primary Examiner* — Robert M Morlan
(74) *Attorney, Agent, or Firm* — MARSHALL, GERSTEIN & BORUN LLP

(57) ABSTRACT

A radio access network (RAN); a core network (CN) or operations, administration, and management (0AM) node; and a user equipment (UE) can implement a method for managing Quality of Experience (QoE) reporting from the UE. The method includes: receiving, by processing hardware and from a UE, a request to reestablish a radio connection; retrieving, by the processing hardware, a configuration for the QoE reporting; and performing at least one of: (i) facilitating, by the processing hardware and after the retrieving, reporting of QoE measurements for the UE to the QoE node, or (ii) releasing the configuration.

20 Claims, 22 Drawing Sheets

(56) References Cited

U.S. PATENT DOCUMENTS

| | | | | |
|---|---|---|---|---|
| 2020/0092762 | A1 | 3/2020 | Shi et al. | |
| 2021/0014746 | A1* | 1/2021 | Wu | H04W 24/10 |
| 2022/0046503 | A1 | 2/2022 | Kumar et al. | |
| 2022/0345970 | A1 | 10/2022 | Kim et al. | |
| 2024/0236745 | A1* | 7/2024 | He | H04W 24/08 |

FOREIGN PATENT DOCUMENTS

| | | | |
|---|---|---|---|
| WO | WO-2021/098074 | A1 | 5/2021 |
| WO | WO-2021/146602 | A1 | 7/2021 |
| WO | WO-2021/215886 | A1 | 10/2021 |

OTHER PUBLICATIONS

Qualcomm Incorporated, "Summary of Offline Discussion on CB #: NRQoE4-Mobility," 3GPP Draft (May 17, 2021).
Ericsson, Mobility Support for NR QoE Management, 3GPP TSG-RAN WG2 Meeting #115-e, R2-2108110 (Aug. 2021).
Japanese Patent Application No. 2023-562740, Notice of Refusal, dated Dec. 23, 2024.
Oppo, Discussion on QoE Measurement collection in NR, 3GPP TSG-RAN WG2 Meeting #113bis electronic, R2-2103147 (Apr. 2021).
Oppo, Discussion on QoE measurement pausing and resuming, 3GPP TSG-RAN WG2 Meeting #113bis electronic, R2-2103146 (Apr. 2021).
"LTE; Evolved Universal Terrestrial Radio Access (E-UTRA) and Evolved Universal Terrestrial Radio Access Network (E-UTRAN); Overal Description; Stage 2," 3GPP TS 36.300 version 16.6.0 Release 16 (2021).
"LTE; Evolved Universal Terrestrial Radio Access (E-UTRA); Radio Resource Control (RRC); Protocol Specification" 3GPP TS 36.331 version 16.5.0 Release 16 (2021).
"Universal Mobile Telecommunications Systems (UMTS); LTE; 5G; Telecommunication Management; Quality of Experience (QoE) Measurement Collection; Control and Configuration," 3GPP TS 28.4056 version 16.0.0 Release 16 (2020).

* cited by examiner

500 ⇥

| Communicate with a UE operating in a connected state | 502 |

Receive, from a network node (e.g., CN or a OAM node), at least one QoE configuration and at least one reference ID, where each reference ID is associated with a particular QoE configuration of the at least one QoE configuration — 504

Assign a different configuration ID for each of the at least one QoE configuration — 506

Transmit the at least one QoE configuration and the at least one configuration ID to the UE — 508

Receive at least one QoE report from the UE in response to the at least one QoE configuration — 510

Receive from a target RAN node a first interface message requesting a UE context of the UE operating in the connected state — 512

Send, to the target RAN node, a second interface message including the at least one QoE configuration, the at least one reference ID, the at least one configuration ID, and information about the association between the at least one reference ID and the at least one configuration ID, for the UE, in response to the first interface message — 514

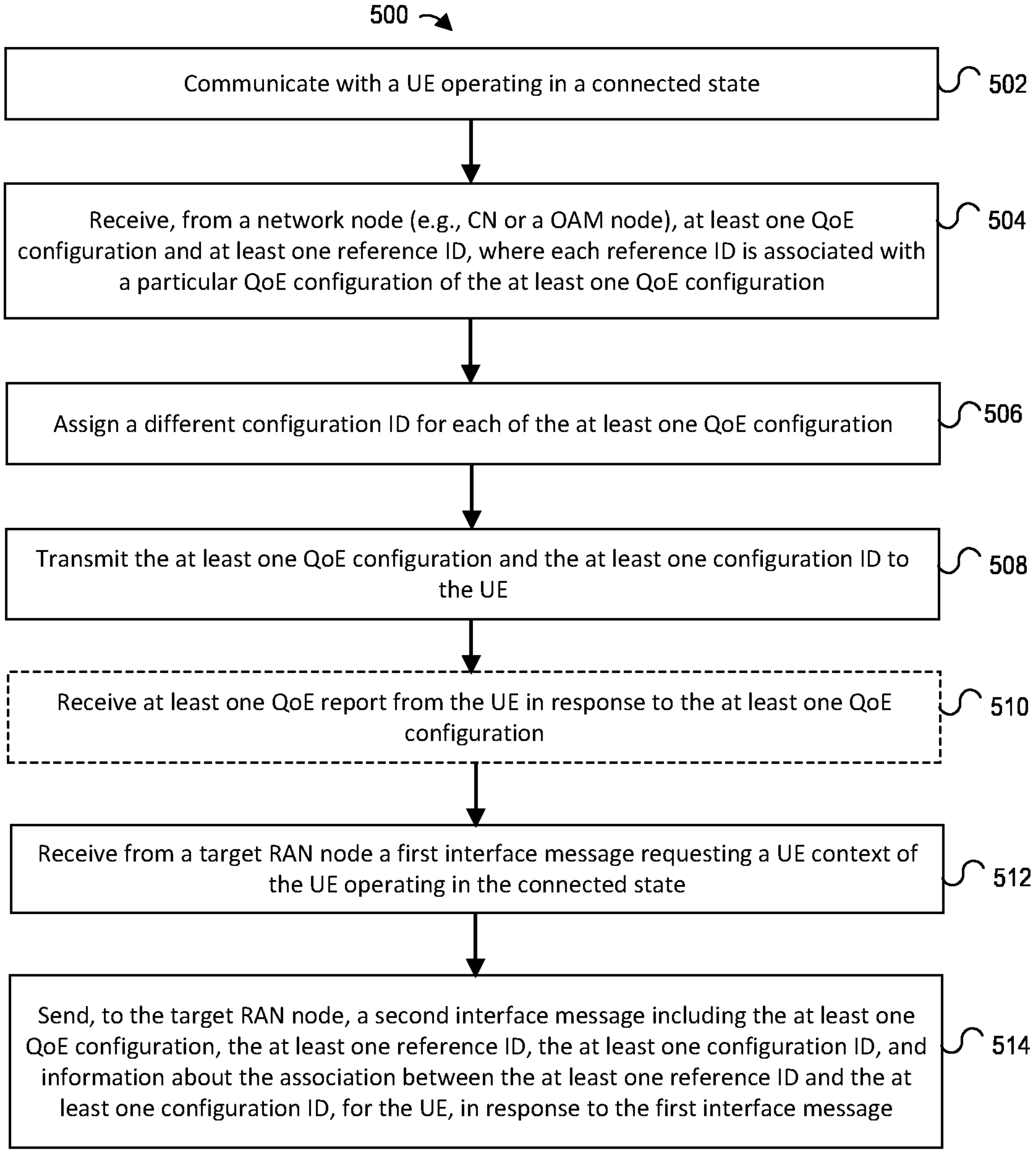

| Receive an RRC reestablishment request message from a UE operating in a connected state | 602 |

| Send a first interface message to a source RAN node in response to receiving the RRC reestablishment request message | 604 |

| Receive from the source RAN node a second interface message including at least one QoE configuration, at least one reference ID, at least one configuration ID, and information on associations between the at least one reference ID and the at least one configuration ID, for the UE | 606 |

| Transmit an RRC reestablishment message to the UE | 608 |

| Transmit an RRC reconfiguration message to the UE | 610 |

| Receive from a QoE node (e.g., CN or the OAM node) a QoE message including a particular reference ID to release or modify a particular QoE configuration | 612 |

| Determine a particular configuration ID corresponding to the particular reference ID from the at least one reference ID | 614 |

| Transmit to the UE a DL RRC message including the particular configuration ID to release or modify the particular QoE configuration | 616 |

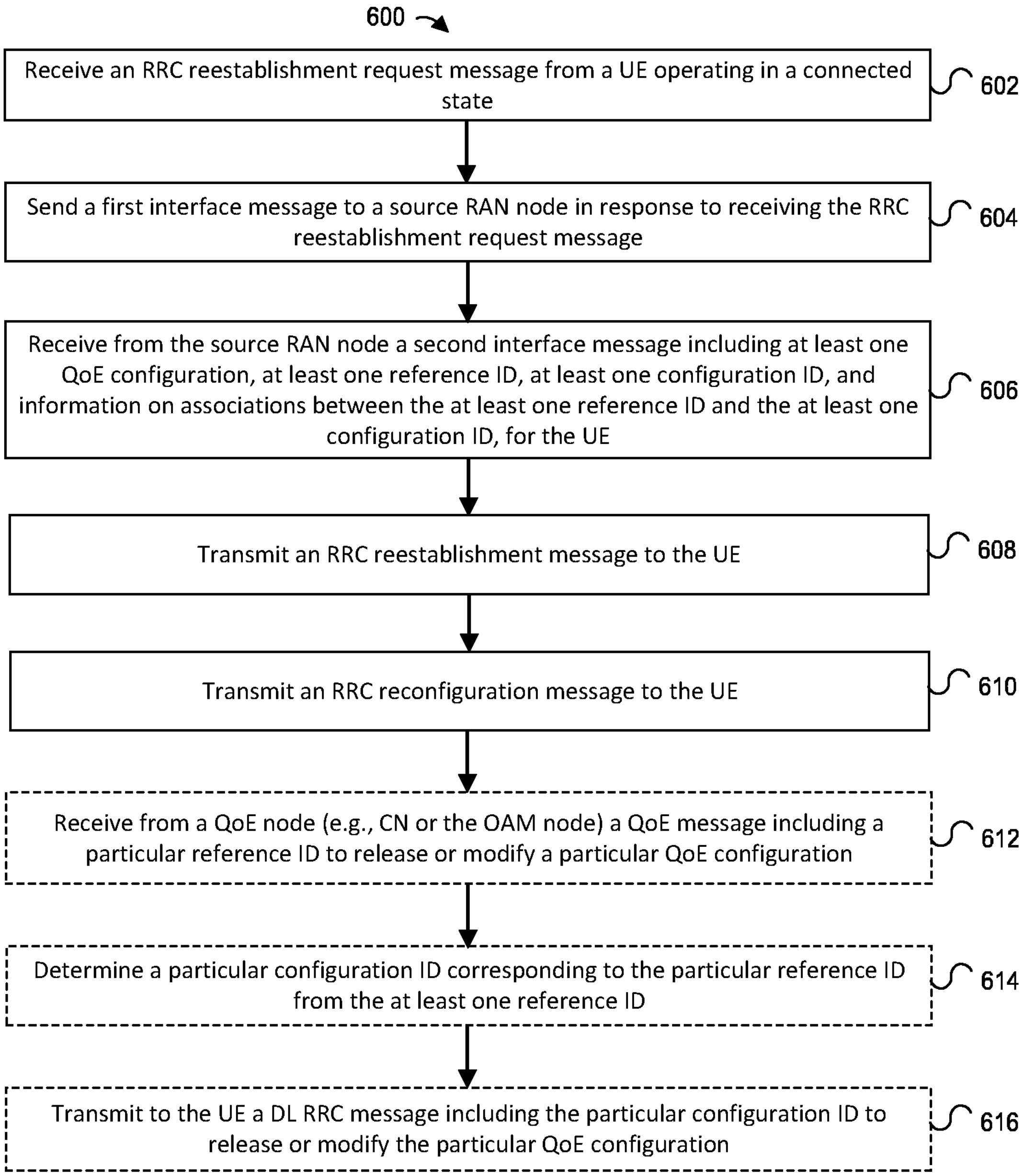

Communicate with a UE operating in a connected state ⤶ 702

Transmit, to the UE, a QoE configuration to activate the UE to perform QoE measurement collection and/or reporting ⤶ 704

Receive a QoE report from the UE in response to the QoE configuration ⤶ 706

Receive, from a target RAN node, a first interface message requesting to obtain a UE Context of the UE operating in the connected state ⤶ 708

Include the QoE configuration in a second interface message ⤶ 710

Has a source RAN node stopped the UE from sending QoE reports for the QoE configuration? 712

No

Yes

Include a QoE pause status indication in the second interface message ⤶ 714

Include a QoE resume indication in the second interface message ⤶ 716

Send the second interface message to the target RAN node ⤶ 718

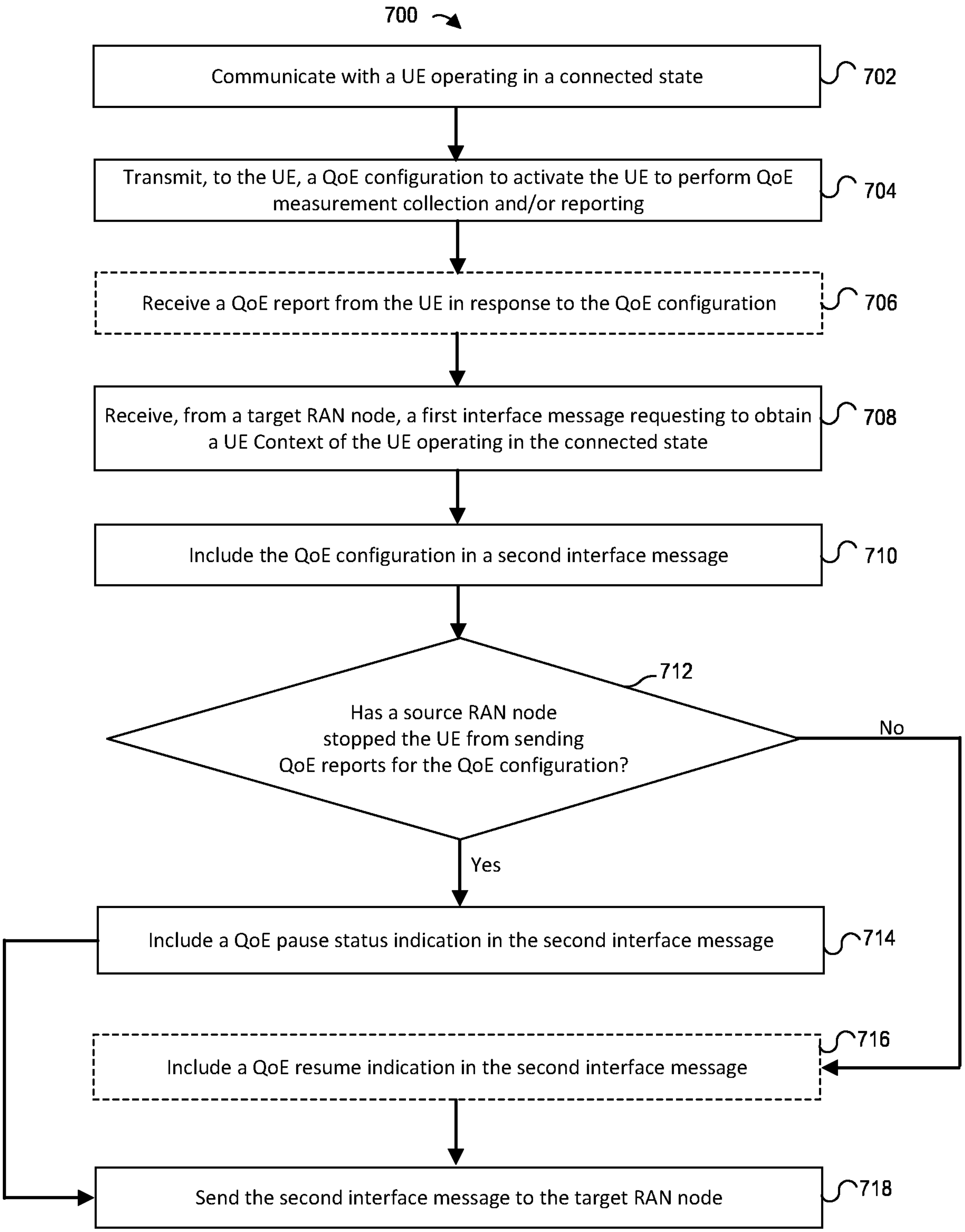

Communicate with a UE operating in a connected state ⌒ 902

Receive, from a QoE node (e.g., CN or a OAM node), at least one QoE configuration and at least one reference ID, where each is associated with a particular QoE configuration of the at least one QoE configuration ⌒ 904

Assign a different configuration ID for each of the at least one QoE configuration ⌒906

Transmit the at least one QoE configuration and the at least one configuration ID to the UE ⌒ 908

Receive at least one QoE report from the UE in response to the at least one QoE configuration ⌒ 910

Perform a reestablishment procedure with the UE operating in the connected state ⌒ 912

Release or modify at least one QoE configuration in response to the reestablishment procedure ⌒ 914

Transmit, to the UE, a DL RRC message including a particular configuration ID to release or modify the particular QoE configuration in response to the determination ⌒ 916

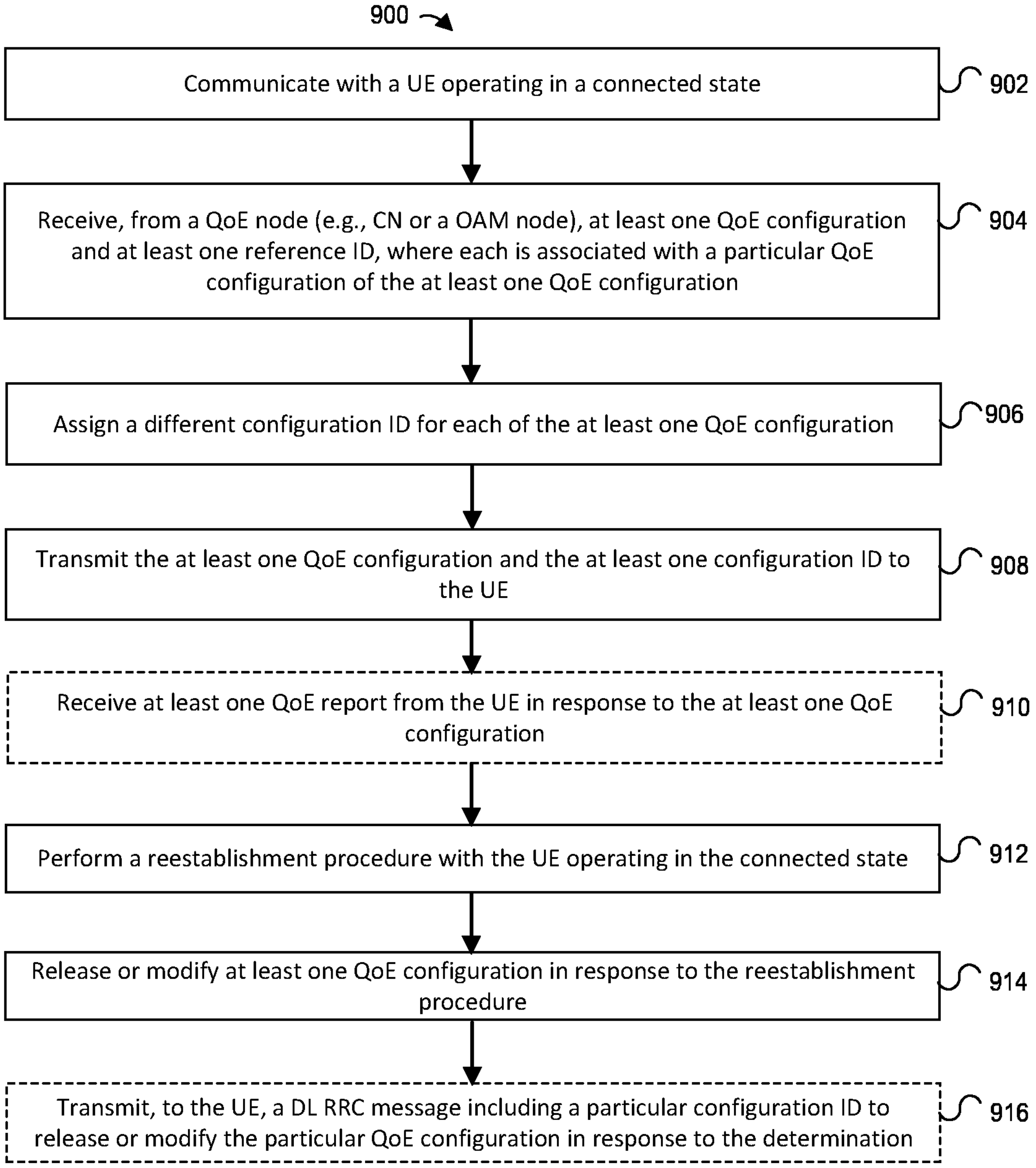

Figure 9

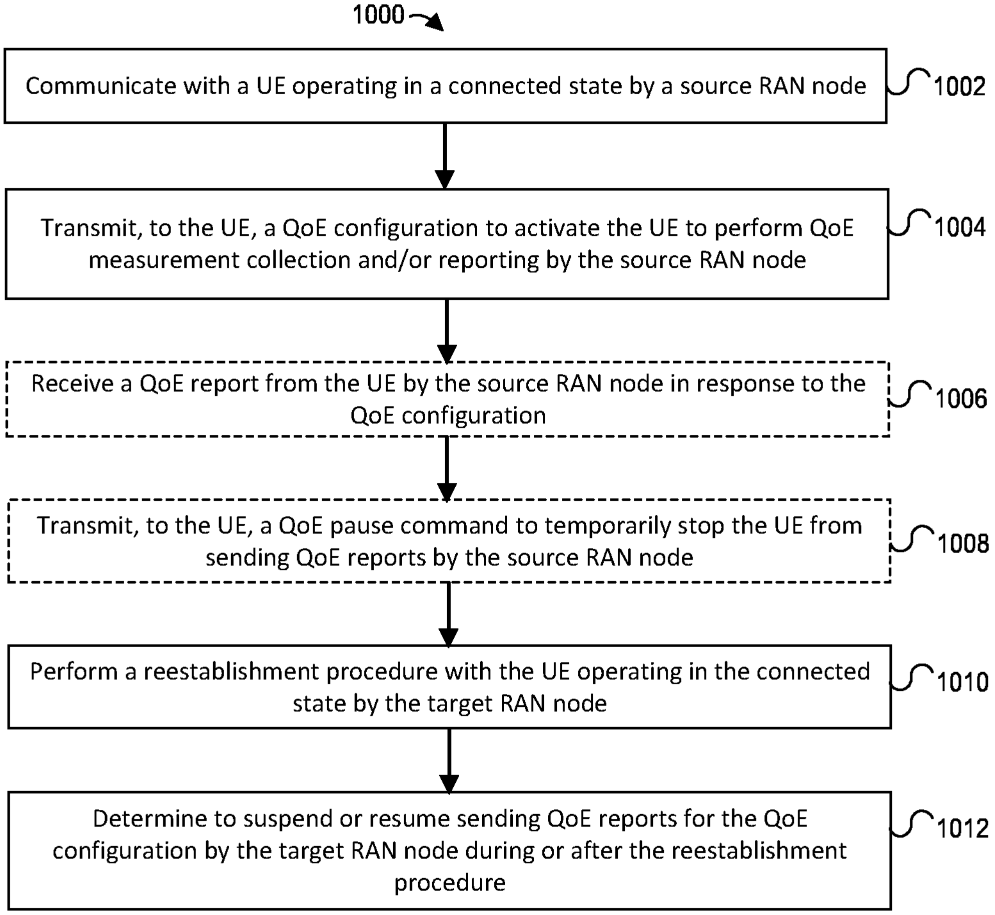

Communicate with a UE operating in a connected state by a source RAN node   1002

Transmit, to the UE, a QoE configuration to activate the UE to perform QoE measurement collection and/or reporting by the source RAN node   1004

Receive a QoE report from the UE by the source RAN node in response to the QoE configuration   1006

Transmit, to the UE, a QoE pause command to temporarily stop the UE from sending QoE reports by the source RAN node   1008

Perform a reestablishment procedure with the UE operating in the connected state by the target RAN node   1010

Determine to suspend or resume sending QoE reports for the QoE configuration by the target RAN node during or after the reestablishment procedure   1012

1100

Communicate with a RAN while operating in a connected state 〜1102

Receive, from the RAN, a QoE configuration activating the UE to perform QoE measurement collection and/or reporting 〜1104

Perform QoE measurement collection and/or reporting in response to or in accordance with the QoE configuration 〜1106

Send a QoE report to the RAN in accordance with the QoE configuration 〜1108

Receive, from the RAN, a QoE pause command temporarily stopping the UE from sending QoE reports for the QoE configuration 〜1110

Suspend sending QoE reports for the QoE configuration in response to the QoE pause command 〜1112

Detect a failure on the communication with RAN 〜1114

Perform a reestablishment procedure with the RAN in response to detection, while operating in the connected state 〜1116

Receive a QoE resume indication for the QoE configuration or a new QoE configuration updating the QoE configuration from the RAN during the reestablishment procedure? 1118

No

Yes

Resume sending QoE reports for the QoE configuration 〜1120

Continue suspending QoE reports for the QoE configuration 〜1122

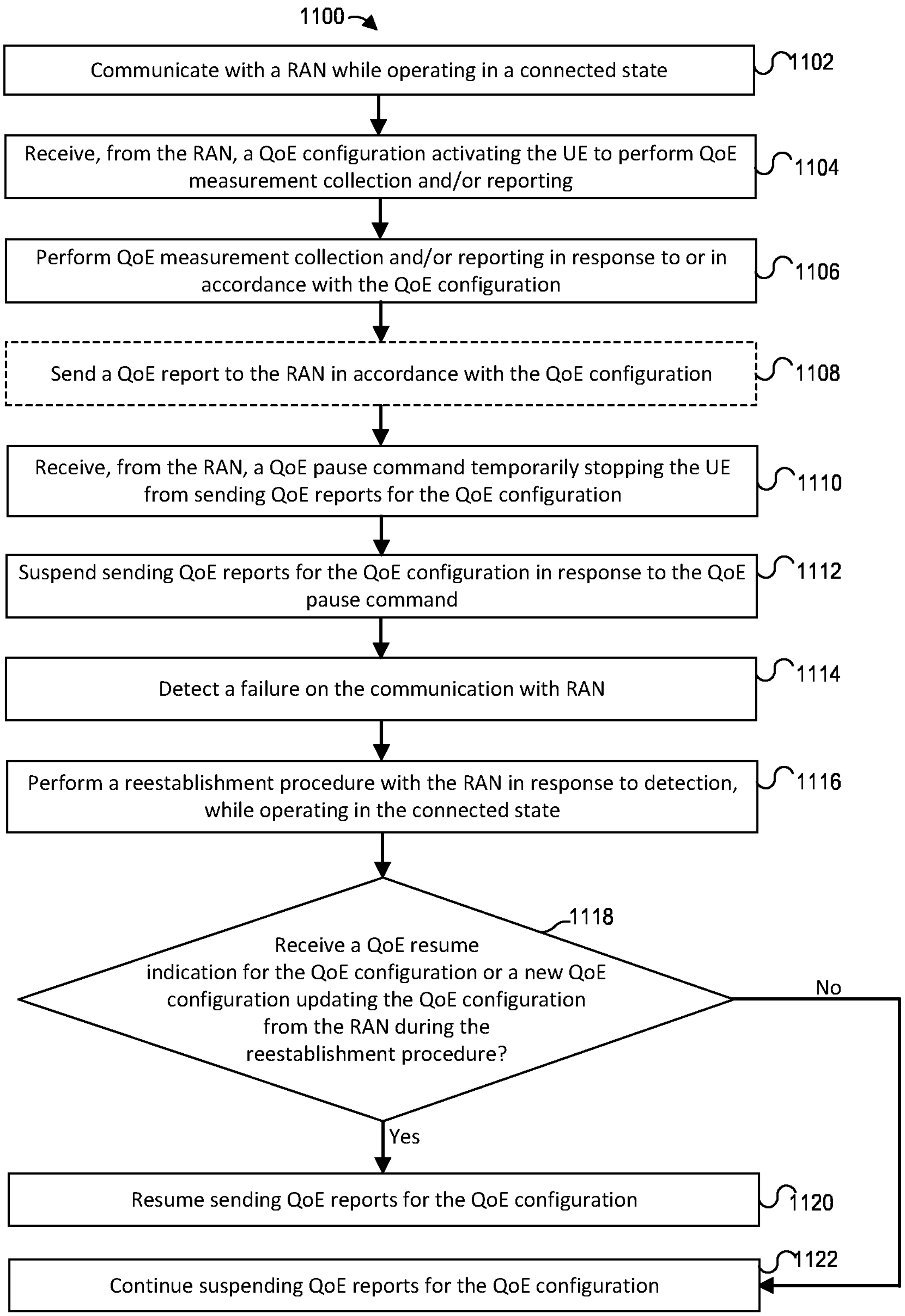

Figure 11

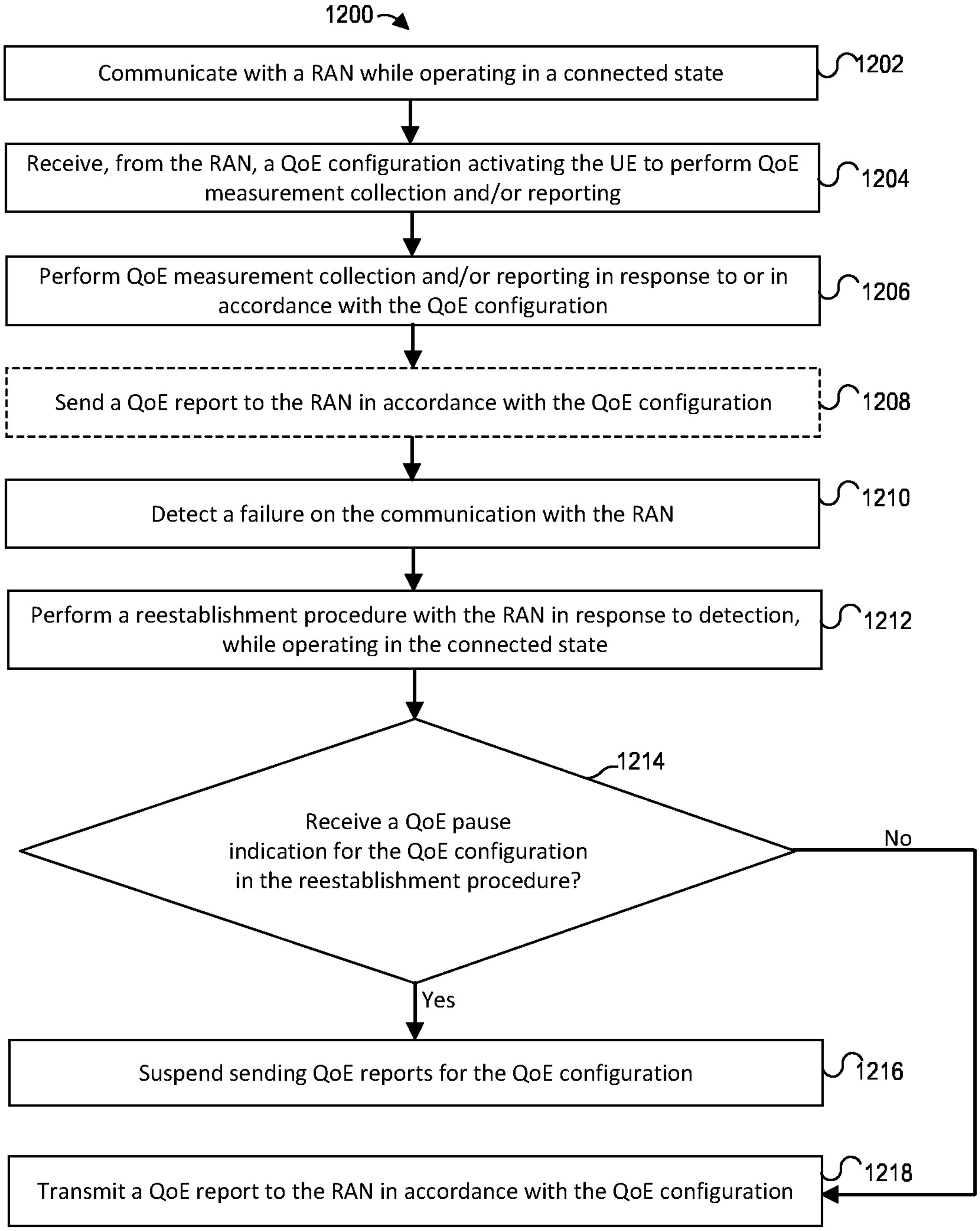

Communicate with a RAN while operating in a connected state    1202

Receive, from the RAN, a QoE configuration activating the UE to perform QoE measurement collection and/or reporting    1204

Perform QoE measurement collection and/or reporting in response to or in accordance with the QoE configuration    1206

Send a QoE report to the RAN in accordance with the QoE configuration    1208

Detect a failure on the communication with the RAN    1210

Perform a reestablishment procedure with the RAN in response to detection, while operating in the connected state    1212

1214

Receive a QoE pause indication for the QoE configuration in the reestablishment procedure?

No

Yes

Suspend sending QoE reports for the QoE configuration    1216

Transmit a QoE report to the RAN in accordance with the QoE configuration    1218

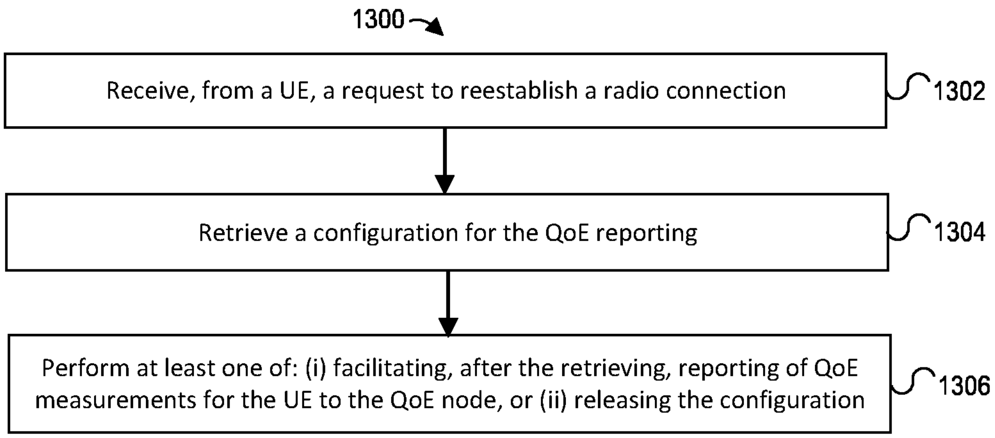

Figure 13

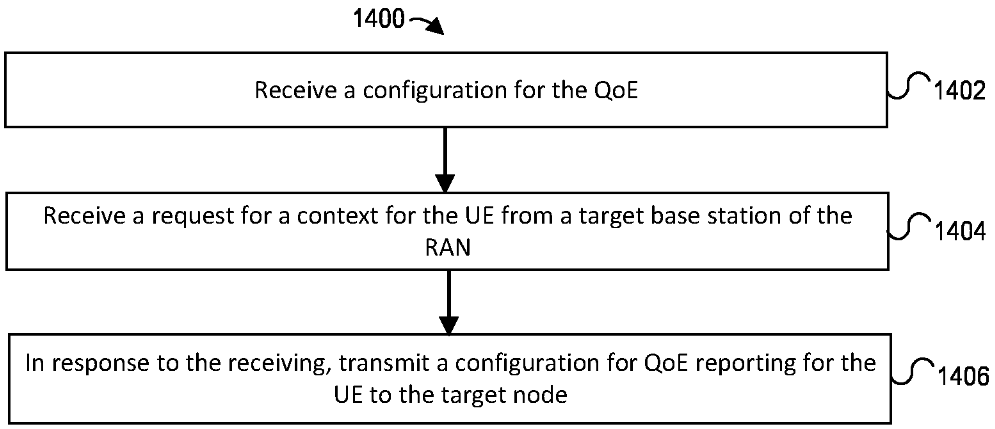

| Receive, from a UE, a request to reestablish a radio connection | ⤳ 1302 |

| Retrieve a configuration for the QoE reporting | ⤳ 1304 |

| Perform at least one of: (i) facilitating, after the retrieving, reporting of QoE measurements for the UE to the QoE node, or (ii) releasing the configuration | ⤳ 1306 |

1400 ⮠

| Receive a configuration for the QoE | ⤳ 1402 |

| Receive a request for a context for the UE from a target base station of the RAN | ⤳ 1404 |

| In response to the receiving, transmit a configuration for QoE reporting for the UE to the target node | ⤳ 1406 |

1500

| Report QoE measurements to a QoE node via a source node of a RAN | 1502 |

| Detect a communication failure between the UE and the source node | 1504 |

| In response to the detecting, perform a radio connection reestablishment procedure with a target node of the RAN | 1506 |

| Determine to perform a QoE operation in response to receiving an indication from the target node | 1508 |

MANAGING QUALITY OF EXPERIENCE REPORTING AFTER RECOVERING FROM FAILURE

FIELD OF THE DISCLOSURE

This disclosure relates to a wireless communications system, more particularly, to a wireless communications system that manages quality of experience measurement collection and reporting during mobility and/or state transition.

BACKGROUND

Mobile networks are enhanced to improve the user experience. As such, the evaluation of the user experience at the UE side is useful to network operators. In particular, such evaluation is useful when operators provide real-time services which require, for example, high data rate and low latency, where even intermittent quality degradation may interrupt a user's experience. Such real-time services include streaming services (typically video services), Multimedia Telephony Service for Internet Multimedia Subsystem (IMS) (MTSI), Multicast and/or Broadcast Service (MBS), and/or extended reality (XR) services. Successful implementation of real-time services will grow mobile traffic, and therefore the focus is on the end user's experience.

Generally speaking, Quality of Experience (QoE) measurement collection (QMC) provides detailed information for a UE, at a call (also called "application session") level. These measurements can provide information that a network operator cannot derive based on RAN or CN measurements. A UE can collect QoE information and provide it to a management system for analysis and/or key performance indicator (KPI) calculations. The collected QoE information can be used by the management system, CN, or RAN for machine learning to optimize operations of the CN or RAN.

In a wireless communication system, a base station that supports a certain Radio Access Technology (RAT) communicates with a user equipment (UE) using, among other protocols, a protocol for controlling radio resources corresponding to the RAT. The protocol for controlling radio resources may be, for example, a Radio Resource Control (RRC) protocol utilized by 4G, 5G, 6G, or later-generation wireless communication systems. Upon establishing a radio connection via the base station, the UE operates in a connected state of the protocol for controlling radio resources, which may be RAT-specific (e.g., EUTRA-RRC CONNECTED, NR-RRC CONNECTED).

In LTE systems, the QMC function enables collection of application layer measurements from the UE. The supported service types can include streaming services and MTSI services. A Trace Function from the Minimization of Drive Tests (MDT) framework activates the QMC. LTE supports signaling-based and management-based initiation cases. For the signaling-based case, the Application Layer Measurement Collection is initiated toward a specific UE from CN nodes using an MDT mechanism. For the management-based case, the Application Layer Measurement Collection is initiated from an operations, administration, and management (OAM) node targeting an area (without targeting a specific UE).

As described in 3GPP specifications 28.405 v16.0.0, 36.300 v16.6.0, and 36.331 v16.5.0, a transparent container encapsulates an application layer measurement configuration received from an OAM node or CN, which a radio access network (RAN) forwards to a UE in a downlink RRC message. After receiving the application layer measurement collection configuration, the UE encapsulates application layer measurements and sends the measurements to the network in an uplink RRC message. The application layer measurement configuration and measurement reporting are supported in an RRC_CONNECTED state only. E-UTRAN can release the application layer measurement configuration toward the UE at any time.

SUMMARY

A network node implements QMC and supports configuration and reporting for multiple simultaneous QoE measurements, for the same or different service types, for a UE. In the event of a communication failure between the UE and a source node of the RAN, the UE initiates a reestablishment procedure with a target base station of the RAN, which retrieves QoE operation information such as a configuration for QoE reporting from the source node.

After retrieving the QoE operation information, the target node may facilitate further QoE reporting or release the configuration if, for example, the target node does not support the QoE operations. Further, the target node may determine that the QoE communication is to be paused or resumed during the reestablishment procedure and determines to suspend or resume those operations.

One example embodiment of these techniques is a method for managing quality of experience (QoE) reporting for a user equipment (UE) initially configured to report QoE measurements to a QoE node via a source node of a radio access network (RAN), the method implemented in a target node of the RAN. The method includes receiving, by processing hardware and from a UE, a request to reestablish a radio connection; retrieving, by the processing hardware, a configuration for the QoE reporting; and performing at least one of: (i) facilitating, by the processing hardware and after the retrieving, reporting of QoE measurements for the UE to the QoE node, or (ii) releasing the configuration.

Another example embodiment of these techniques is a method for managing quality of experience (QoE) reporting for a user equipment (UE) to a QoE node, the method implemented in a source node in a radio access network (RAN). The method includes receiving, by processing hardware, a configuration for the QoE; receiving, by the processing hardware, a request for a context for the UE from a target base station of the RAN; and, in response to the receiving, transmitting, by the processing hardware, a configuration for QoE reporting for the UE to the target node.

Still another example embodiment of these techniques is a method for managing quality of experience (QoE) reporting, the method implemented in a user equipment (UE). The method includes reporting, by processing hardware, QoE measurements to a QoE node via a radio access network (RAN); detecting, by the processing hardware, a communication failure between the UE and a source node of the RAN; in response to the detecting, performing, by the processing hardware, a radio connection reestablishment procedure with a target node of the RAN; and determining, by the processing hardware, to perform a QoE operation in response to receiving an indication from the target node.

BRIEF DESCRIPTION OF THE DRAWINGS

FIG. 5 is a flow diagram of an example method for receiving at least one QoE configuration and reference identifier, assigning configuration identifiers for the configurations, and transmitting configuration and identifiers to a target BS, implemented in a source BS;

FIG. 6 is a flow diagram of an example method for receiving at least one QoE configuration, reference identifier, and configuration identifier, and subsequently receiving an indication to release or modify a QoE configuration using a reference identifier, implemented in a target BS;

FIG. 7 is a flow diagram of an example method for determining whether to include an indication to pause or resume a QoE configuration based on whether the source BS has suspended QoE reporting, implemented in a source BS;

FIG. 9 is a flow diagram of an example method for receiving at least one QoE configuration and reference identifier, assigning configuration identifiers, and transmitting the configuration and configuration identifiers to the UE, implemented in a RAN;

FIG. 10 is a flow diagram of an example method for determining to suspend or resume QoE reporting for a QoE configuration during or after a reestablishment procedure, implemented in a RAN;

FIG. 11 is a flow diagram of an example method for determining whether to resume or continue to suspend QoE reporting based on whether the UE receives one of a resume indication for a QoE configuration or a new QoE configuration, implemented in a UE;

FIG. 12 is a flow diagram of an example method for determining whether to suspend or continue QoE reporting in accordance with a configuration based on whether the UE receives a pause indication in the reestablishment procedure, implemented in a UE;

FIG. 13 is a flow diagram of an example method for managing QoE measurement collection and reporting, implemented in a target BS;

FIG. 14 is a flow diagram of an example method for managing QoE measurement collection and reporting, implemented in a source BS.

DETAILED DESCRIPTION

A UE, a source node of a RAN, a target node of a RAN, a core network, and/or an operations, administration, and management node implement the techniques of this disclosure to manage QoE measurement and reporting after a communication failure. The target node may receive commands to pause and/or resume QoE reporting during a reestablishment process. Alternatively, the target node may determine to release and/or modify a QoE configuration for QoE reporting during the reestablishment process.

Figure 1A:
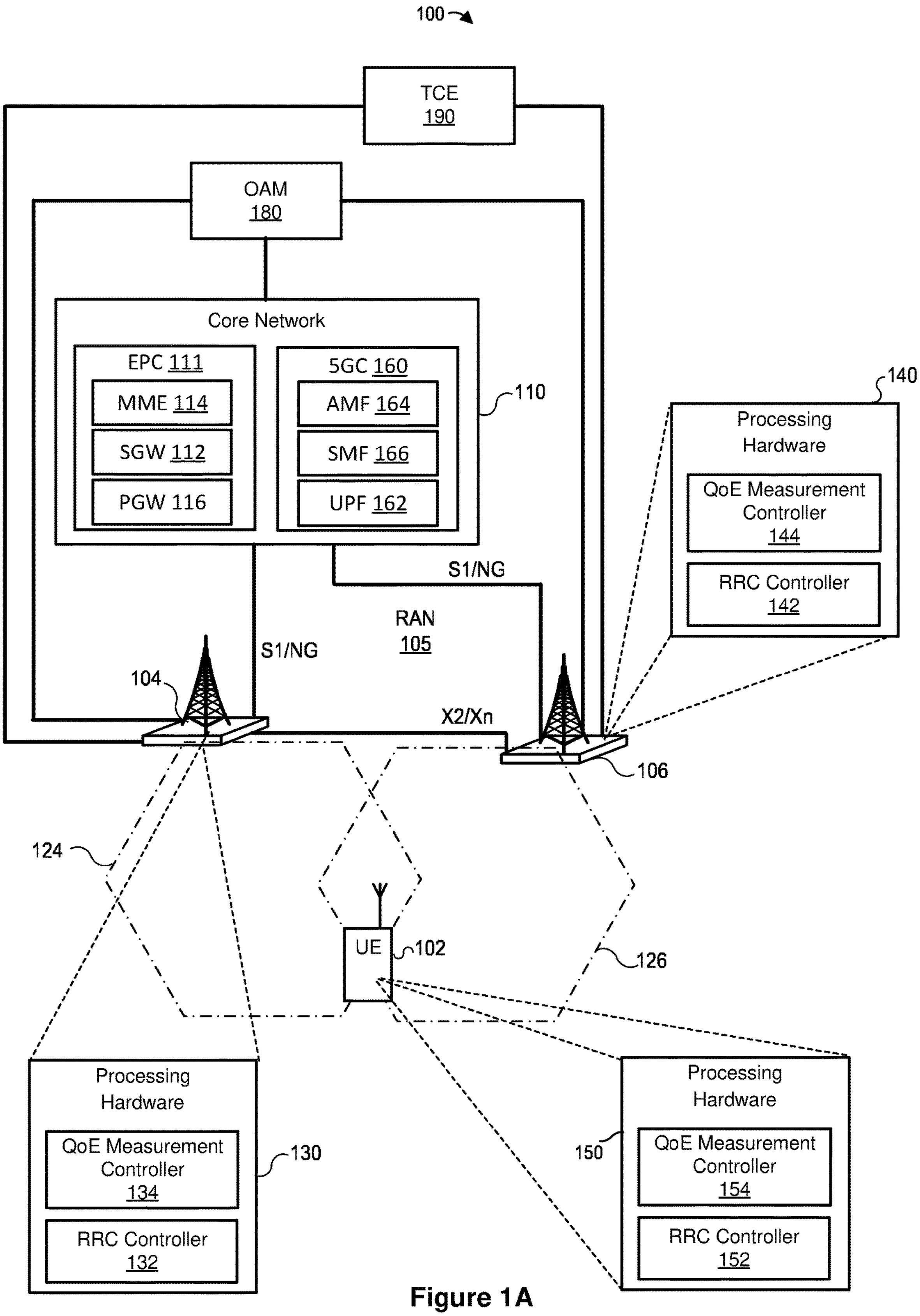
FIG. 1A is a block diagram of an example system in which a base station (BS) and/or a user equipment (UE) can implement the techniques of this disclosure for managing quality of experience (QoE) measurement collection and reporting in a UE.

In particular, referring first to FIG. 1A, an example wireless communication system 100 includes a UE 102, a source base station (S-BS) 104, a target base station (T-BS) 106, and a core network (CN) 110. The wireless communication system 100 also includes an operations, administration, and management node (OAM) 180 and a Trace Collection Entity (TCE) and/or Multi-cell/Multicast Coordination Entity (MCE) 190. The base stations 104 and 106 can operate in a radio access network (RAN) 105 connected to the core network (CN) 110. The CN 110 can be implemented as an evolved packet core (EPC) 111 or a fifth generation (5G) core (5GC) 160, for example. The CN 110 can also be implemented as a sixth generation (6G) core in another example.

The S-BS 104 covers a cell 124, and the T-BS 106 covers a cell 126. If the S-BS 104 is a gNB, the cell 124 is an NR cell. If the base station 124 is an ng-eNB or eNB, the cell 124 is an evolved universal terrestrial radio access (E-UTRA) cell. Similarly, if the T-BS 106 is a gNB, the cell 126 is an NR cell, and if the base station 126 is an ng-eNB or eNB, the cell 126 is an E-UTRA cell. The cells 124 and 126 can be in the same Radio Access Network (RAN) Notification Areas (RNA) or different RNAs. In general, the RAN 105 can include any number of base stations, and each of the base stations can cover one, two, three, or any other suitable number of cells. The UE 102 can support at least a 5G NR (or simply, "NR") or E-UTRA air interface to communicate with the base stations 104 and 106. Each of the base stations 104, 106 can connect to the CN 110 via an interface (e.g., S1 or NG interface). The base stations 104 and 106 also can be interconnected via an interface (e.g., X2 or Xn interface) for interconnecting NG RAN nodes.

Among other components, the EPC 111 can include a Serving Gateway (SGW) 112, a Mobility Management Entity (MME) 114, and a Packet Data Network Gateway (PGW) 116. The SGW 112 in general is configured to transfer user-plane packets related to audio calls, video calls, Internet traffic, etc., and the MME 114 is configured to manage authentication, registration, paging, and other related functions. The PGW 116 provides connectivity from the UE 102 to one or more external packet data networks (e.g., an Internet network and/or an Internet Protocol (IP) Multimedia Subsystem (IMS) network). The 5GC 160 includes a User Plane Function (UPF) 162 and an Access and Mobility Management Function (AMF) 164, and/or Session Management Function (SMF) 166. Generally speaking, the UPF 162 is configured to transfer user-plane packets related to audio calls, video calls, Internet traffic, etc.; the AMF 164 is configured to manage authentication, registration, paging, and other related functions; and the SMF 166 is configured to manage PDU sessions.

As illustrated in FIG. 1A, the S-BS 104 supports a cell 124, and the T-BS 106 supports a cell 126. The cells 124 and 126 can partially overlap, so that the UE 102 can select, reselect, or hand over from one of the cells 124 and 126 to the other. To directly exchange messages or information, the S-BS 104 and T-BS 106 can support an X2 or Xn interface. In general, the CN 110 can connect to any suitable number of base stations supporting NR cells and/or EUTRA cells.

S-BS 104 and UE 102 establish a connection via which the UE 102 and the S-BS 104 transmit data payload (e.g., wirelessly). Upon establishing the connection via S-BS 104, UE 102 is in a connected state of the RAT protocol for controlling radio resources (e.g., EUTRA-RRC_CONNECTED, NR-RRC CONNECTED). S-BS 104 maintains a context of the UE 102, where the context of the UE 102 includes configuration information and other information associated with the connection between UE 102 and S-BS 104. The context of UE 102 may include configurations of an SRB1, an SRB2, an SRB4, a DRB, and/or other configurations (e.g., security configuration) associated with the connection between UE 102 and S-BS 104.

At some point in time, UE 102 establishes, resumes, or re-establishes a radio connection with T-BS 106 for servicing. This may occur in various scenarios. In one scenario ("the handover scenario"), S-BS 104 determines that UE 102 is to handover to T-BS 106. In another scenario ("the re-establishment scenario"), UE 102 detects radio link failure (RLF) over the established connection with S-BS 104 or detects integrity check failure on the SRB1, SRB2 or SRB4, and subsequently select T-BS 106 for servicing. In yet another scenario ("the re-selection scenario"), S-BS 104 detects that below-threshold or no-data activity for UE 102 has occurred over some interval of time over the established connection. Upon this detection, S-BS 104 instructs UE 102 to enter into an inactive state of the RAT protocol (e.g., EUTRA-RRC INACTIVE, NR-RRC INACTIVE). At some point in time thereafter, such as when UE 102 has moved into a different coverage arca and has payload data to transmit to the system, UE 102 (which is in the inactive state) selects or reselects T-BS 106 for servicing.

The S-BS 104 is equipped with processing hardware 130 that can include one or more general-purpose processors (e.g., CPUs) and a non-transitory computer-readable memory storing instructions that the one or more general-purpose processors execute. Additionally or alternatively, the processing hardware 130 can include special-purpose processing units. The processing hardware 130 in an example implementation includes an RRC controller 132 to implement procedures and messaging at the RRC sublayer of the protocol communication stack. The processing hardware 130 can also include a QMC controller 134 configured to manage QoE configuration(s) and QoE reports for one or more UEs. The T-BS 106 can include generally similar components. In particular, components 142 and 144 can be similar to the components 132 and 134, respectively.

The UE 102 is equipped with processing hardware 150 that can include one or more general-purpose processors such as CPUs and non-transitory computer-readable memory storing machine-readable instructions executable on the one or more general-purpose processors, and/or special-purpose processing units. The processing hardware 150 in an example implementation includes an RRC controller 152 to implement procedures and messaging at the RRC sublayer of the protocol communication stack. The processing hardware 150 can also include a QMC controller 154 configured to manage QoE configuration(s), QMC, and reporting.

Figure 1B:
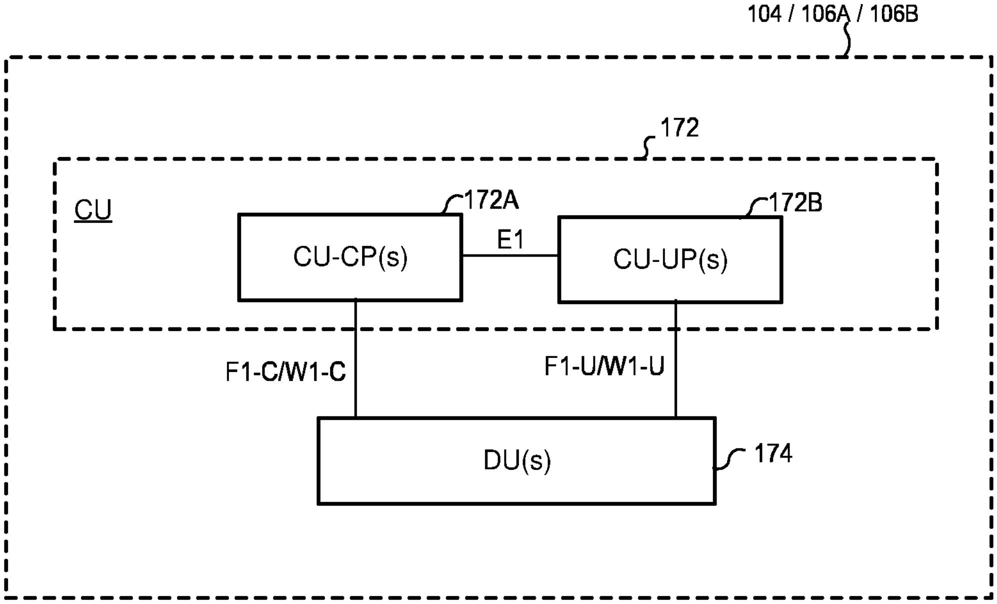
FIG. 1B is a block diagram of an example base station including a central unit (CU) and a distributed unit (DU) that can operate in the system of FIG. 1A.

FIG. 1B depicts an example distributed or disaggregated implementation of any one or more of the base stations 104, 106. In this implementation, the base stations 104A, 104B, 106A, or 106B includes a central unit (CU) 172 and one or more DUs 174. The CU 172 includes processing hardware, such as one or more general-purpose processors (e.g., CPUs) and a computer-readable memory storing machine-readable instructions executable on the general-purpose processor(s), and/or special-purpose processing units. For example, the CU 172 can include a PDCP controller; an RRC controller; and/or a paging controller such as PDCP controller 134, 144, RRC controller 136, 146, and/or paging controller 138, 148. In some implementations, the CU 172 includes a radio link control (RLC) controller configured to manage or control one or more RLC operations or procedures. In other implementations, the CU 172 does not include an RLC controller.

Each of the DUs 174 also includes processing hardware that can include one or more general-purpose processors (e.g., CPUs) and computer-readable memory storing machine-readable instructions executable on the one or more general-purpose processors, and/or special-purpose processing units. In some implementations, the processing hardware includes a MAC controller (e.g., MAC controller 132, 142) configured to manage or control one or more MAC operations or procedures (e.g., a random access procedure), and/or an RLC controller configured to manage or control one or more RLC operations or procedures. The processing hardware can also include a physical layer controller configured to manage or control one or more physical layer operations or procedures.

In some implementations, the CU 172 includes a logical node CU-CP 172A that hosts the control plane part of the PDCP protocol of the CU 172. The CU 172 can also include logical node(s) CU-UP 172B that host the user plane part of the PDCP protocol and/or Service Data Adaptation Protocol (SDAP) protocol of the CU 172. The CU-CP 172A can transmit control information (e.g., RRC messages, F1 application protocol messages), and the CU-UP 172B can transmit the data packets (e.g., SDAP PDUs or Internet Protocol packets).

The CU-CP 172A can connect to multiple CU-UP 172B through the E1 interface. The CU-CP 172A selects the appropriate CU-UP 172B for the requested services for the UE 102. In some implementations, a single CU-UP 172B connects to multiple CU-CP 172A through the E1 interface. If the CU-CP and DU(s) belong to a gNB, the CU-CP 172A can connect to one or more DU 174*s* through an F1-C interface and/or an F1-U interface. If the CU-CP and DU(s) belong to an ng-eNB, the CU-CP 172A can connect to one or more DU 174s through a W1-C interface and/or a W1-U interface. In some implementations, one DU 174 connects to multiple CU-UPs 172B under the control of the same CU-CP 172A. In such implementations, the CU-CP 172A establishes the connectivity between a CU-UP 172B and a DU 174 using Bearer Context Management functions.

Figure 2A:
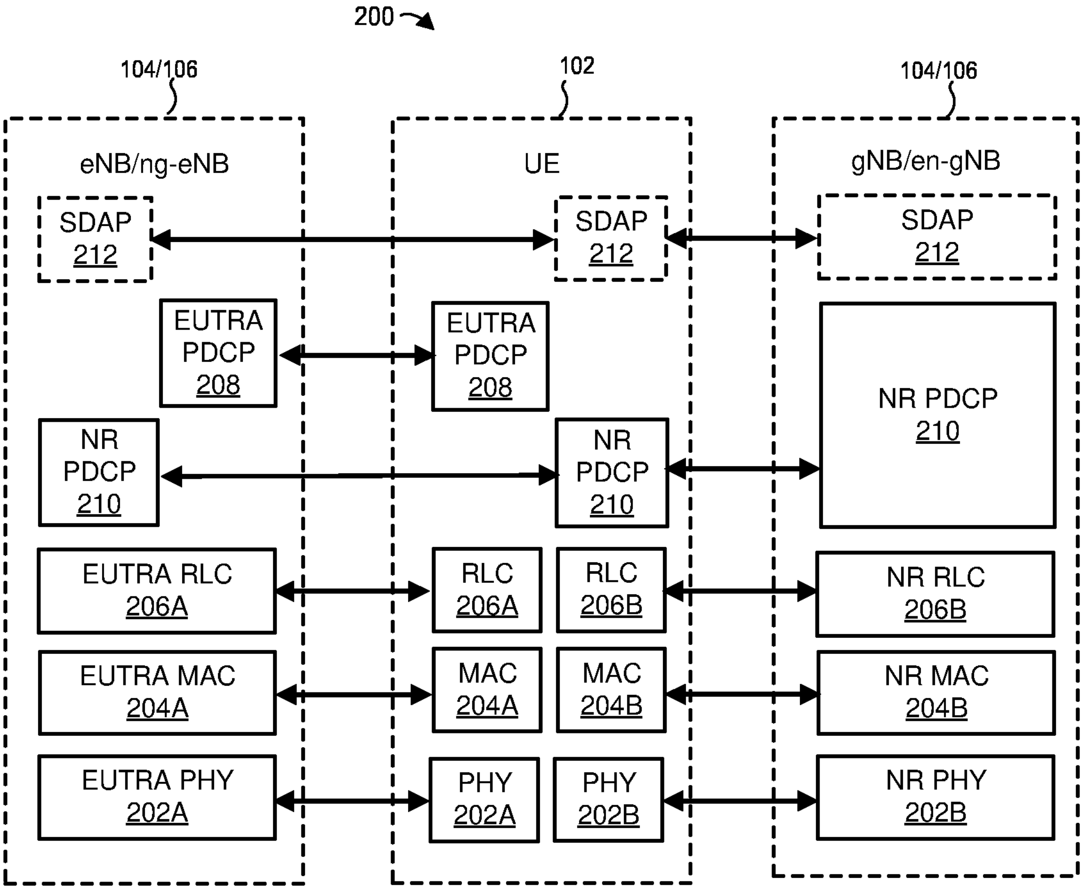
FIG. 2A is a block diagram of an example protocol stack according to which the UE of FIGS. 1A-B can communicate with base stations.

FIG. 2A illustrates, in a simplified manner, an example protocol stack 200 according to which the UE 102 can communicate with an eNB/ng-eNB or a gNB (e.g., one or more of the base stations 104, 106).

In the example stack 200, a physical layer (PHY) 202A of EUTRA provides transport channels to the EUTRA MAC sublayer 204A, which in turn provides logical channels to the EUTRA RLC sublayer 206A. The EUTRA RLC sublayer 206A in turn provides RLC channels to a EUTRA PDCP sublayer 208 and, in some cases, to an NR PDCP sublayer 210. Similarly, the NR PHY 202B provides transport channels to the NR MAC sublayer 204B, which in turn provides logical channels to the NR RLC sublayer 206B. The NR RLC sublayer 206B in turn provides data transfer services to the NR PDCP sublayer 210. The NR PDCP sublayer 210 in turn can provide data transfer services to Service Data Adaptation Protocol (SDAP) 212 or a radio resource control (RRC) sublayer (not shown in FIG. 2A). The UE 102, in some implementations, supports both the EUTRA and the NR stack, as shown in FIG. 2A, to support handover between EUTRA and NR base stations and/or to support DC over EUTRA and NR interfaces. Further, as illustrated in FIG. 2A, the UE 102 can support layering of NR PDCP 210 over EUTRA RLC 206A, and SDAP sublayer 212 over the NR PDCP sublayer 210.

The EUTRA PDCP sublayer 208 and the NR PDCP sublayer 210 receive packets (e.g., from an Internet Protocol (IP) layer, layered directly or indirectly over the PDCP layer 208 or 210) that can be referred to as service data units (SDUs), and output packets (e.g., to the RLC layer 206A or 206B) that can be referred to as protocol data units (PDUs). Except where the difference between SDUs and PDUs is relevant, this disclosure for simplicity refers to both SDUs and PDUs as "packets."

On a control plane, the EUTRA PDCP sublayer 208 and the NR PDCP sublayer 210 can provide signaling radio bearers (SRBs) or an RRC sublayer (not shown in FIG. 2A) to exchange RRC messages or non-access-stratum (NAS) messages, for example. On a user plane, the EUTRA PDCP sublayer 208 and the NR PDCP sublayer 210 can provide data radio bearers (DRBs) to support data exchange. Data exchanged on the NR PDCP sublayer 210 can be SDAP PDUs, Internet Protocol (IP) packets, or Ethernet packets.

Figure 2B:
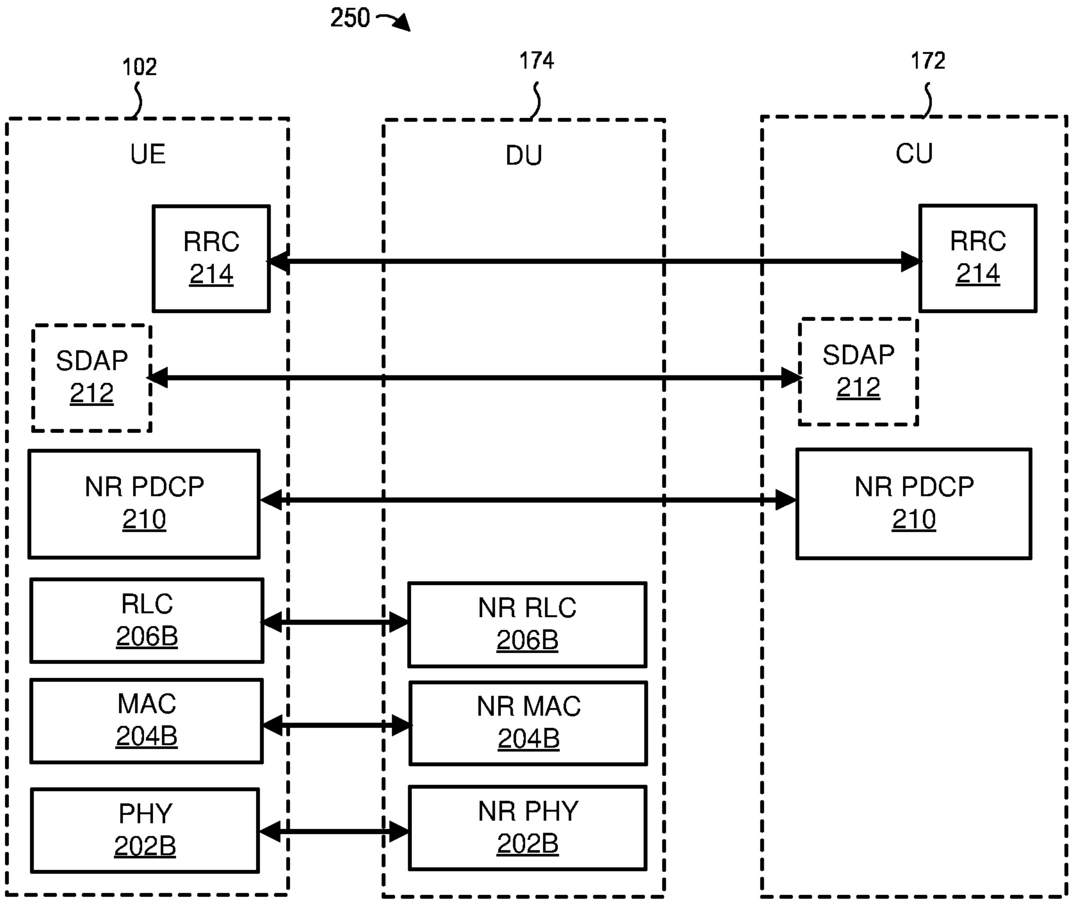
FIG. 2B is a block diagram of an example protocol stack according to which the UE of FIGS. 1A-B can communicate with base stations using a distributed architecture.

Thus, it is possible to functionally split the radio protocol stack, as shown by the radio protocol stack 250 in FIG. 2B. The CU can hold all the control and upper layer functionalities (e.g., RRC 214, SDAP 212, and NR PDCP 210), while the lower layer operations (e.g., NR RLC 206B, NR MAC 204B, and NR PHY 202B) are delegated to the DU 174. To support connection to a 5GC, NR PDCP 210 provides SRBs to RRC 214, and NR PDCP 210 provides DRBs to SDAP 212 and SRBs to RRC 214.

Figure 3A:
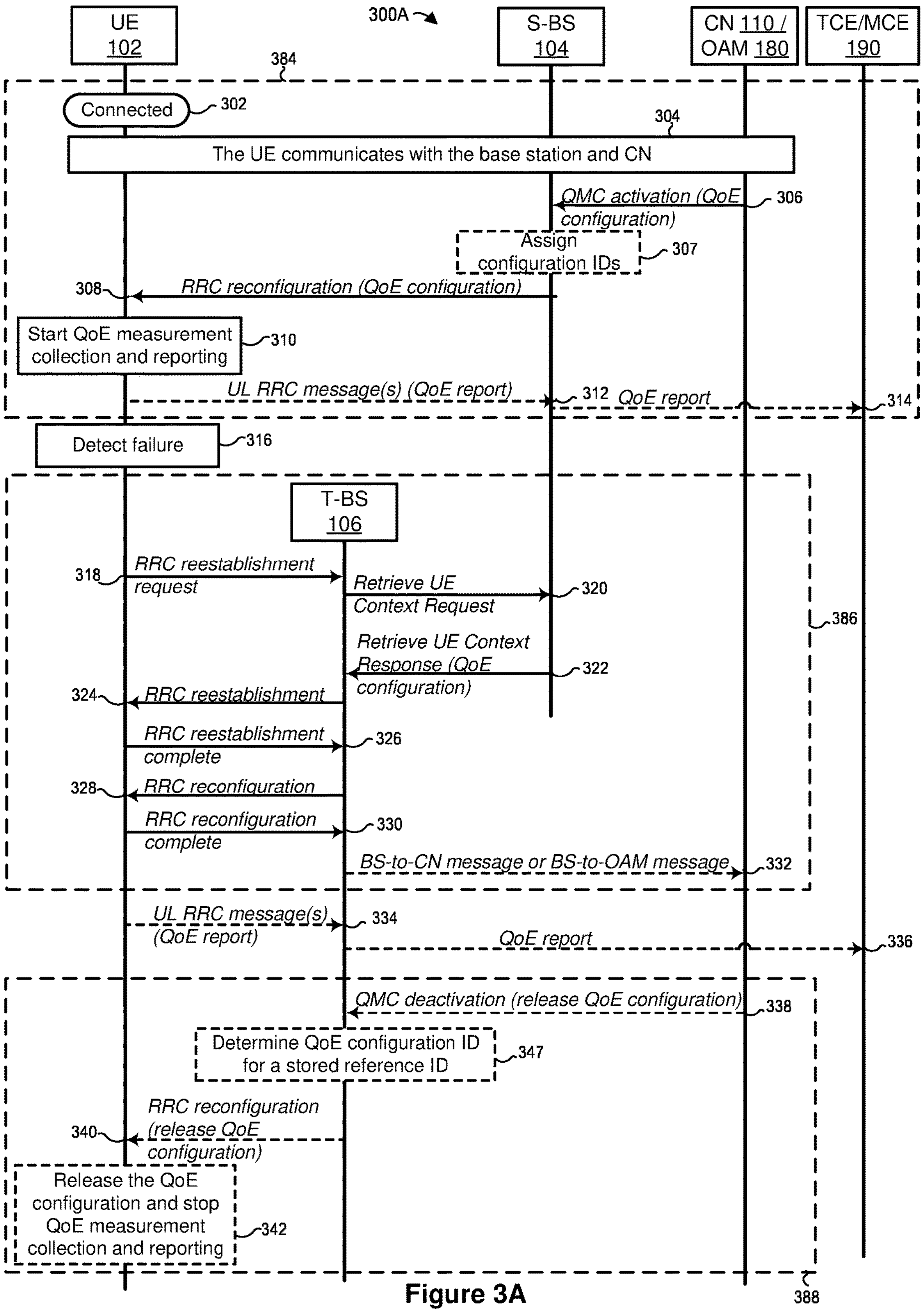
FIG. 3A illustrates an example scenario in which a RAN performs a reestablishment procedure for a UE that was performing quality of experience (QoE) measurement collection (QMC) and reporting, before releasing a QoE configuration.

FIGS. 3A-3G are message sequences of example scenarios in which a RAN facilitates Quality of Experience (QoE) measurement collection (QMC) and reporting for a UE and a CN or OAM node during mobility. Generally speaking, equivalent events in FIGS. 3A-3G are labeled with similar reference numbers (e.g., event 384 in FIG. 3A is similar to event 384 in FIGS. 3B-3G) with differences discussed below where appropriate. With the exception of the differences shown in the figures and discussed below, any of the alternative implementations discussed with respect to a particular event (e.g., for messaging and processing) may apply to events labeled with similar reference numbers in other figures and also to both integrated and distributed base stations.

Referring first to FIG. 3A, in a scenario 300A, the UE initially operates 302 in a connected state (e.g., RRC_CONNECTED) with a base station 104 (e.g., an S-BS 104) of a RAN 105. While in the connected state, the UE 102 communicates 304 with the S-BS 104 (e.g., via cell 124) and a CN 110. In some implementations, the UE 102 can communicate information with the S-BS 104 via a control plane (CP). Depending on the implementation, the UE 102 communicates the information via SRB(s) and/or DRB(s). The SRB(s) include SRB1 and/or SRB2. The CN 110 or an OAM 180 transmits 306 to the S-BS 104 a QMC activation command to activate QMC and reporting for the UE 102. The QMC activation command can include one or more QoE configurations. In some implementations, the QMC activation command also includes a particular reference identifier, such as a reference ID, identifying each of the QoE configuration(s). In some implementations, the reference ID is a QoE reference ID. In other implementations, the reference ID is a service type. Depending on the implementation, the activation command can additionally include Trace ID(s) associated with each of, different sets of, or all of the QoE configuration(s). In other implementations, the activation command includes a particular configuration identifier (i.e., configuration ID) for each of the QoE configuration(s) as interface IE(s) of the activation command. In some implementations, the CN 110 generates or assigns a value to the configuration ID (i.e., CN configuration ID). In other implementations, the OAM 180 generates or assigns a value to the configuration ID (i.e., OAM configuration ID). Alternatively, the activation command does not include a configuration ID identifying a QoE configuration.

In some implementations, the activation command includes an indication of the QMC pause or resume status. In some implementations, the activation command includes IE(s) describing area information (i.e., areaScope), Interfaces to Trace IE, Trace Depth IE, TCE IP Address (e.g., IP address of the TCE 190), MCE IP Address (e.g., IP address of the MCE 190), and/or the TCE URI as interface IEs in the activation command. In some implementations, the CN 110 or OAM 180 transmits the one or more QoE configurations and/or any other information elements described above to the S-BS 104 while communicating 304 with the S-BS 104 and the UE 102.

In some implementations, the QMC activation command is a Trace Start message. In further implementations, the QMC activation command is included in an OAM-to-BS message or a CN-to-BS message (e.g., an NGAP message). In such cases, the QoE activation command can be an interface IE of the OAM-to-BS message or CN-to-BS message. The CN 110 or OAM 180 may transmit 306 the CN-to-BS message or OAM-to-BS message, respectively, including the QMC activation command to the S-BS 104. Depending on the implementation, the reference ID(s) may have the same or different values. In some implementations, as mentioned previously, the CN 110 or OAM 180 generates the reference ID(s) and/or configuration ID(s).

In some implementations, the one or more QoE configurations are associated with a first Trace ID. In other implementations, the CN 110 or OAM 180 includes in the QMC activation command one or more additional Trace IDs for additional QoE configurations beyond the first QoE configuration. Depending on the implementation, there may be an additional Trace ID for each of the additional QoE configurations, or multiple QoE configurations may be associated with a single Trace ID. The CN 110 or OAM 180 can generate each Trace ID with a different value. Alternatively, the CN 110 or OAM 180 can obtain the Trace ID(s) from the TCE/MCE 190.

In some implementations, the S-BS 104 can assign 307 each of the QoE configuration ID(s) to a particular value. There are several implementations to assign or determine the value(s). In one implementation, the S-BS 104 derives the value(s) of the QoE configuration ID(s) from the CN or OAM configuration ID(s), such as in cases where the S-BS 104 receives the CN or OAM configuration ID(s) at event 306. In such implementations, there can be a one-to-one mapping between the QoE configuration ID(s) and the CN or OAM configuration ID(s). For example, the S-BS 104 can use a function with a value of the CN or OAM configuration ID as an input to obtain a QoE configuration ID. In some such implementations, the function is a hash function or has a simple formula. In another example, the S-BS 104 sets the value(s) of the QoE configuration(s) to value(s) of the CN or OAM configuration ID(s) associated with the QoE configuration(s) that the S-BS 104 received at event 306.

In cases where the S-BS 104 does not receive CN or OAM configuration ID(s) for the QoE configuration(s), the S-BS 104 can generate (e.g., determine or assign) 307 a particular QoE configuration ID and/or value for each of the QoE configuration(s) without referring to ID(s) (e.g., reference ID(s) or Trace ID(s)) received at event 306. For example, the S-BS 104 can generate a particular QoE configuration ID and/or value for each of the QoE configuration(s) in accordance with an order of the QoE configuration(s) in the QoE activation command. In another example, the S-BS 104 can generate a particular QoE configuration ID and/or value for each of the QoE configurations by referring to ID(s) (e.g., reference ID(s) or Trace ID(s)) received at event 306, similar to referring to the CN or OAM configuration ID(s) described above.

The S-BS 104 then transmits 308 a message (e.g., an RRC reconfiguration message) including the QoE configuration(s) to the UE 102. In some implementations, the S-BS 104 generates a QoE configuration identifier, such as a QoE configuration ID (e.g., measConfigAppLayerId), associated with a particular QoE configuration of the QoE configuration(s). The S-BS 104 can include the QoE configuration ID(s) associated with the QoE configuration(s) in the message 308. The UE 102 can transmit (not shown) a "complete" message to the S-BS 104, such as an RRC reconfiguration complete message in response to the message 308.

In some implementations, the S-BS 104 can additionally include association information about the relationship between the QoE configuration ID(s) and the QoE configuration(s) in the message 308. In one implementation, the association information is represented by a data structure of an IE including a list of the QoE configuration ID(s) and the QoE configuration(s) in the message 308. In some implementations, the list is structured as {QoE configuration ID, QoE configuration}. For example, the QoE configuration(s) include $1^{st}$, $2^{nd}$, . . . , $M^{th}$ QoE configuration(s) with QoE configuration ID X, . . . , (X+M−1), respectively, where M is an integer larger than 0 and X can be 0 or 1. In cases where X is 0, X can be omitted. In cases where X is 1, the QoE configuration(s) include $1^{st}$, $2^{nd}$, . . . m $M^{th}$ QoE configuration(s) with QoE configuration ID 1, . . . . M, respectively. The S-BS 104 can include {QoE configuration ID X, the $1^{st}$ QoE configuration}, {QoE configuration ID X+1, the $2^{nd}$ QoE configuration}, . . . , {QoE configuration ID (X+M−1), the $M^{th}$ QoE configuration} in the message 308. In accordance with the association information, the UE 102 can associate the QoE configuration ID(s) with the QoE configuration(s).

In response to receiving 308 the reconfiguration message, the UE 102 starts 310 QMC and reporting. In some implementations, after starting 310 QMC and reporting, the UE 102 transmits 312 uplink (UL) message(s) to the S-BS 104, the message(s) containing one or more QoE reports. In some implementations, the uplink message(s) are UL RRC message(s) and the UE 102 transmits the UL RRC message(s) to the S-BS 104 via an SRB. In some implementations, the SRB is an SRB4. In such implementations, the S-BS 104 can include, in the RRC reconfiguration 308, configuration parameter(s) to configure the SRB4. Alternatively, the S-BS 104 can send, to the UE 102, a DL RRC message (e.g., an RRC reconfiguration message) including configuration parameter(s) to configure the SRB4 during event 304 or before event 312. Depending on the implementation, the S-BS 104 then transmits 314 the one or more QoE reports to the TCE/MCE 190. In some implementations, the QoE report(s) are encapsulated in transparent container(s) that the S-BS 104 receives 312 from the UE 102 and forwards to the CN 110 or OAM 180.

In some implementations, the UE 102 transmits 312 the QoE report(s) on a periodic basis. In other implementations, the UE 102 transmits 312 the QoE report(s) in response to particular and/or predefined triggering events. In some such implementations, the S-BS 104 immediately transmits 314 any received 312 QoE report(s) to the CN 110 or OAM 180. In other implementations, the S-BS 104 aggregates the QoE reports before sending a message including a plurality of the QoE reports to the CN 110 or OAM 180. In yet other implementations, the S-BS 104 aggregates the QoE reports with QoE reports from other UE(s) before sending a message including a plurality of the QoE reports to the CN 110 or OAM 180.

The events 302, 304, 306, 308, 310, 312, and 314 are collectively referred to in FIG. 3A as a QMC activation procedure 384.

After the S-BS 104 receives (not shown) the "complete" message or the UE 102 begins QMC and reporting, the UE 102 detects 316 a failure in communication with the S-BS 104. In some implementations, the failure can be a radio link failure, reconfiguration failure, integrity check failure, or a reconfiguration with sync failure as described in 3GPP technical specification 38.331 (e.g., v16.5.0) section 5.3.10.3. In response to detecting the failure, the UE 102 can suspend transmissions, the SRB(s), and/or the DRB(s).

In response to detecting the failure, the UE 102 initiates an RRC reestablishment procedure. In response to the initiation, the UE 102 transmits 318 an RRC reestablishment request message (e.g., RRCReestablishmentRequest message) to the base station 106 (e.g., T-BS 106 via cell 126). In response to or after receiving the RRC reestablishment request message, the T-BS 106 sends 320 a Retrieve UE Context Request message to the S-BS 104. In response, the S-BS 104 sends 322 a Retrieve UE Context Response message to the T-BS 106. Depending on the implementation, the Retrieve UE Context Response message includes the QoE configuration(s), the QoE configuration ID(s), the Trace ID(s), the Interfaces to Trace IE, the Trace Depth IE, the TCE IP Address (e.g., IP address of the TCE 190), the MCE IP Address (e.g., IP address of the MCE 190), the reference ID(s), an indication of the QMC activation and/or pause status, and/or the TCE URI as interface IEs in the Retrieve UE Context Response message. In some implementations, the Retrieve UE Context Response message can include IE(s) describing area information (i.e., areaScope) for the QoE configuration(s). In further implementations, the S-BS 104 includes the QMC activation command in the Retrieve UE Context Response message.

In some implementations, the S-BS 104 can additionally include association information about the relationship between the QoE configuration ID(s) and the QoE configuration(s), reference ID(s), or Trace ID(s) in the Retrieve UE Context Response message. In one implementation, the association information can be represented by a data structure of an IE including a list of the QoE configuration ID(s) and the QoE configuration(s) in the Retrieve UE Context Response message. In some implementations, the list is structured as {QoE configuration ID, QoE configuration}. For example, the QoE configuration(s) include $1^{st}$, $2^{nd}$, . . . , $M^{th}$ QoE configuration(s) with QoE configuration ID X, . . . , (X+M−1), respectively, where M is an integer larger than 0 and X can be 0 or 1. The S-BS 104 can include {QoE configuration ID X, the $1^{st}$ QoE configuration}, {QoE configuration ID X+1, the $2^{nd}$ QoE configuration}, . . . , {QoE configuration ID (X+M−1), the Mth QoE configuration} in the Retrieve UE Context Response message.

Alternatively, the S-BS 104 does not include the association information and the association information can be predefined in a 3GPP specification. In such cases, the T-BS 106 can associate the QoE configuration ID(s) with the QoE configuration in accordance with the predefined rule in the 3GPP specification. In some implementations, the S-BS 104 can include the QoE configuration ID(s) and the QoE configuration(s) in a first list and a second list in the Retrieve UE Context Response message. For example, the QoE configuration(s) include $1^{st}$, $2^{nd}$, . . . , $M^{th}$ QoE configuration(s) with QoE configuration ID(s) X, . . . , (X+M−1) respectively, where M is an integer larger than 0 and X can be 0 or 1. The first list can be {QoE configuration ID X, QoE configuration ID X+1, . . . , QoE configuration ID (X+M−1)}, and the second list can be {the $1^{st}$ QoE configuration, the $2^{nd}$ QoE configuration, . . . , the $M^{th}$ QoE configuration}, where the first position, the second position, . . . , the $M^{th}$ position in the first list corresponds to the first position, the second position, . . . , the $M^{th}$ position in the second list respectively. The correspondence can be predefined in the 3GPP specification.

In some implementations, the S-BS 104 includes an RRC inter-node message IE in the Retrieve UE Context Response message in addition to the interface IEs described above. In further implementations, the S-BS 104 includes the QoE configuration ID(s) and the QoE configuration(s) in the RRC inter-node message IE. In still further implementations, the S-BS 104 can additionally include association information about the relationship between the QoE configuration ID(s) and the QoE configuration(s) in the RRC inter-node message IE. In one implementation, the association information can be represented by a data structure of an IE including a list of the QoE configuration ID(s) and the QoE configuration(s) in the RRC inter-node message. For example, the QoE configuration(s) include $1^{st}$, $2^{nd}$, . . . , $M^{th}$ QOE configuration(s) with QoE configuration ID X, . . . , (X+M−1), respectively, where M is an integer larger than 0 and X can be 0 or 1. The S-BS 104 can include {QoE configuration ID X, the $1^{st}$ QoE configuration}, {QoE configuration ID X+1, the $2^{nd}$ QoE configuration}, . . . , {QoE configuration ID (X+M−1), the Mth QoE configuration} in the RRC inter-node message.

Alternatively, the S-BS 104 does not include the association information and the association information can be predefined in a 3GPP specification. In such cases, the T-BS 106 can associate the QoE configuration ID(s) to the QoE configuration in accordance with the predefined rule in the 3GPP specification. In some implementations, the S-BS 104 can include the QoE configuration ID(s) and the QoE configuration(s) in a first list and a second list in the RRC inter-node message. For example, the QoE configuration(s) include $1^{st}$, $2^{nd}$, . . . $M^{th}$ QoE configuration(s) with QoE configuration ID X, . . . , (X+M−1) respectively, where M is an integer larger than 0 and X can be 0 or 1. The first list can be {QoE configuration ID X, QoE configuration ID X+1, . . . , QoE configuration ID (X+M−1)}, and the second list can be {the $1^{st}$ QoE configuration, the $2^{nd}$ QoE configuration, . . . , the $M^{th}$ QoE configuration}, where the first position, the second position, . . . , the $M^{th}$ position in the first list corresponds to the first position, the second position, . . . , the $M^{th}$ position in the second list respectively. The correspondence can be predefined in the 3GPP specification.

In other implementations, the S-BS 104 does not include the QoE configuration ID(s) and the QoE configuration(s) in the RRC inter-node message.

In some implementations, unlike a base station that manages only a single QoE configuration for a UE, the S-BS 104 transmits multiple QoE configurations, QoE configuration IDs, and reference IDs or Trace IDs, and may further transmit association information or other information related to multiple QoE configurations, as described above. The T-BS 106 may then store the QoE configuration(s) and/or the QoE configuration ID(s) as described in regard to FIGS. 6 and 7.

After receiving 322 the Retrieve UE Context Response message, the T-BS 106 then transmits 324 an RRC reestablishment message (e.g., RRCReestablishment message) to the UE 102, e.g., via cell 126. In response, the UE 102 transmits 326 an RRC reestablishment complete message to the T-BS 106. In some implementations, the UE 102 resumes the SRB1 after transmitting the RRC reestablishment request message or receiving the RRC reestablishment message. After transmitting the RRC reestablishment message or receiving the RRC reestablishment complete message, the T-BS 106 transmits 328 an RRC reconfiguration message to the UE 102. In response, the UE 102 can transmit 330 an RRC reconfiguration complete message to the T-BS 106. In some implementations, the S-BS 104 indicates to the UE 102 to resume the SRB(s) (e.g., SRB2 and/or SRB4) and the DRB(s) in the RRC reconfiguration message. For example, the S-BS 104 can indicate to the UE 102 to resume the SRB(s) and the DRB(s) by excluding release indication(s) for the SRB(s) in the RRC reconfiguration message 328. In response to or after receiving 328 the RRC reconfiguration message, the UE 102 resumes the SRB(s) (e.g., SRB2 and/or SRB4) and the DRB(s).

The T-BS 106 may then transmit 332 a BS-to-CN message (e.g., Path Switch Request message) or BS-to-OAM message to the CN 110 or OAM 180, respectively, indicating that the UE 102 connects to the T-BS 106. The events 318, 320, 322, 324, 326, 328, 330 and 332 are collectively referred to in FIG. 3A as a reestablishment procedure 386.

After performing the reestablishment procedure 386 or resuming the SRB(s) and the DRB(s), the UE 102 communicates information with the T-BS 106 and the CN 110. In some implementations, after performing the reestablishment procedure 386, the UE 102 continues or resumes QoE reporting, transmitting 334 UL message(s) to the T-BS 106 including one or more QoE reports, similar to event 312 above. The T-BS 106 then transmits 336 the one or more QoE reports to the TCE/MCE 190, as described in event 314 above. In other implementations, the UE 102 may suspend the QMC and/or QoE reporting after performing the reestablishment procedure 386 or resuming the SRB(s) and the DRB(s). In some such implementations, the UE 102 suspends the QMC and/or QoE reporting because the T-BS 106 may not belong to an area configured in the area configuration. In such cases, the S-BS 104 may include the area configuration in the RRC reconfiguration message 308.

In some implementations, the UE 102 suspends the QMC in response to detecting 316 the failure, in order to remove the impact of the failure from the QMC. Thus, when a management system analyzes or processes the QoE report(s), the management system does not need to exclude or identify some of the QoE report(s) that were affected by the failure. In such cases, the UE 102 resumes the QMC after performing the reestablishment procedure 386 or resuming the SRB(s) and the DRB(s). In other implementations, the UE 102 continues the QMC when detecting 316 the failure, and additionally can record the failure in a failure report. The UE 102 then can transmit the failure information to the T-BS 106, which in turn transmits the failure information to the TCE/MCE 190. When the management system analyzes or processes the QoE report(s), the management system can identify or process some of the QoE report(s) that were affected by the failure. In some implementations, the management system is part of the TCE/MCE 190. In other implementations, the management system is a network node other than the TCE/MCE 190. In such cases, the TCE/MCE 190 forwards the QoE report(s) and/or failure report to the network node.

The CN 110 or OAM 180 eventually determines to deactivate the QMC and reporting. As such, the CN 110 or OAM 180 transmits 338 a QMC deactivation message to the T-BS 106, including a command to release one or more QoE configurations configured in the procedure 384. In some implementations, the T-BS 106 may determine 347 whether there is a QoE configuration ID for a stored reference ID as described in FIGS. 6 and 7. The T-BS 106, upon receiving the message, transmits 340 an RRC reconfiguration message to the UE 102, the message including the command to release the indicated QoE configuration. The UE 102 then releases 342 the indicated QoE configuration and stops the QMC and reporting processes. The events 338, 347, 340 and 342 are collectively referred to in FIG. 3A as QMC deactivation procedure 388.

In some implementations, the QMC deactivation message is a Deactivate Trace message. In other implementations, the QMC deactivation message (e.g., Trace Deactivation IE, QoE Deactivate IE, or QoE Deactivation IE) is included in an OAM-to-BS message or a CN-to-BS message (e.g., NGAP message). In such implementations, the CN 110 or OAM 180 transmit 338 the message (i.e., the OAM-to-BS message or the CN-to-BS message) including the QMC deactivation message to the T-BS 106. In this manner, QoE configuration(s) for a UE is transferred from a first base station to a second base station and the CN or OAM can deactivate QMC at the second base station.

In some implementations with a single Trace IDS, the CN 110 or the OAM 180 includes the Trace ID in the QMC deactivation message to command the T-BS 106 to release all of the QoE configurations for the UE 102. The T-BS 106 can then send 340 the reconfiguration message to the UE 102, commanding the UE 102 to release all of the QoE configurations using the single Trace ID. In further implementations, the CN 110 or the OAM 180 includes a particular reference ID in the QMC deactivation message to indicate that the T-BS 106 should release a QoE configuration associated with the reference ID for the UE 102. In some such implementations, the T-BS 106 obtains a particular QoE configuration ID in accordance with the particular reference ID and the association information. In yet other implementations, the CN 110 or the OAM 180 includes a particular Trace ID in the QMC deactivation message to indicate that the T-BS 106 should release a QoE configuration associated with the Trace ID for the UE 102. In some such implementations, the T-BS 106 obtains a particular QoE configuration ID in accordance with the particular Trace ID and the association information.

In this manner, both (i) reestablishing QMC and/or QoE reporting after a UE detects a communication failure and (ii) subsequently causing the UE to stop QMC and/or QoE reporting via a T-BS of a RAN are achieved.

Figure 3B:
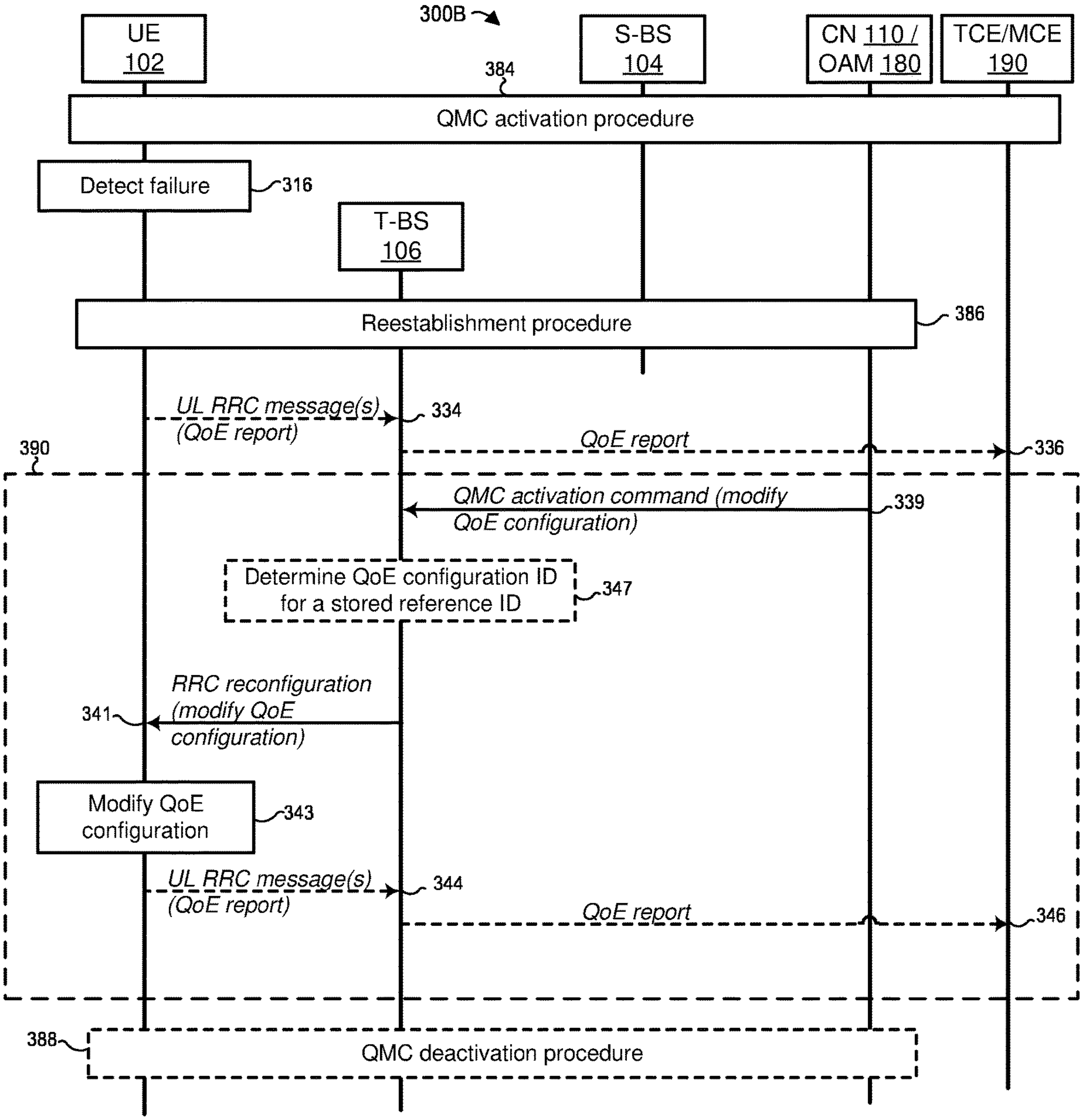
FIG. 3B illustrates a scenario similar to that of FIG. 3A, but in which the RAN transmits a command to the UE to modify the QoE configuration rather than a release command.

Referring next to FIG. 3B, a scenario 300B is similar to 300A and similarly involves an S-BS 104 and UE 102 activating QMC and reporting for the UE 102 before detecting a communication error and performing a reestablishment procedure with a T-BS 106. However, unlike scenario 300A, the RAN 105 transmits a command to the UE 102 after the reestablishment procedure to modify the QoE configuration rather than release the QoE configuration.

After performing the reestablishment procedure 386 and, depending on the implementation, continuing the QMC and reporting 334/336 with the UE 102 and the T-BS 106, the CN 110 or OAM 180 transmits 339 a QMC activation command to the T-BS 106. The CN 110 or OAM 180 includes a command to modify the one or more QoE configurations in the QMC activation command. The T-BS 106 then transmits 341 a radio resource reconfiguration message (e.g., an RRC reconfiguration message) to the UE 102, the message including the command to modify the one or more QoE configurations. Upon receiving 341 the radio resource reconfiguration message, the UE 102 modifies 343 the one or more QoE configurations and begins transmitting 344 uplink RRC messages including QoE reports to the T-BS 106 in accordance with the modified QoE configurations. The T-BS 106 may then transmit 346 the reports to the TCE/MCE node 190. The events 339, 347, 341, 343, 344, and 346 are collectively referred to in FIG. 3B as QMC modification procedure 390. Depending on the implementation, the UE 102, T-BS 106, and CN 110 or OAM 180 may later perform the QMC deactivation procedure 388 detailed in FIG. 3A above.

Figure 3C:
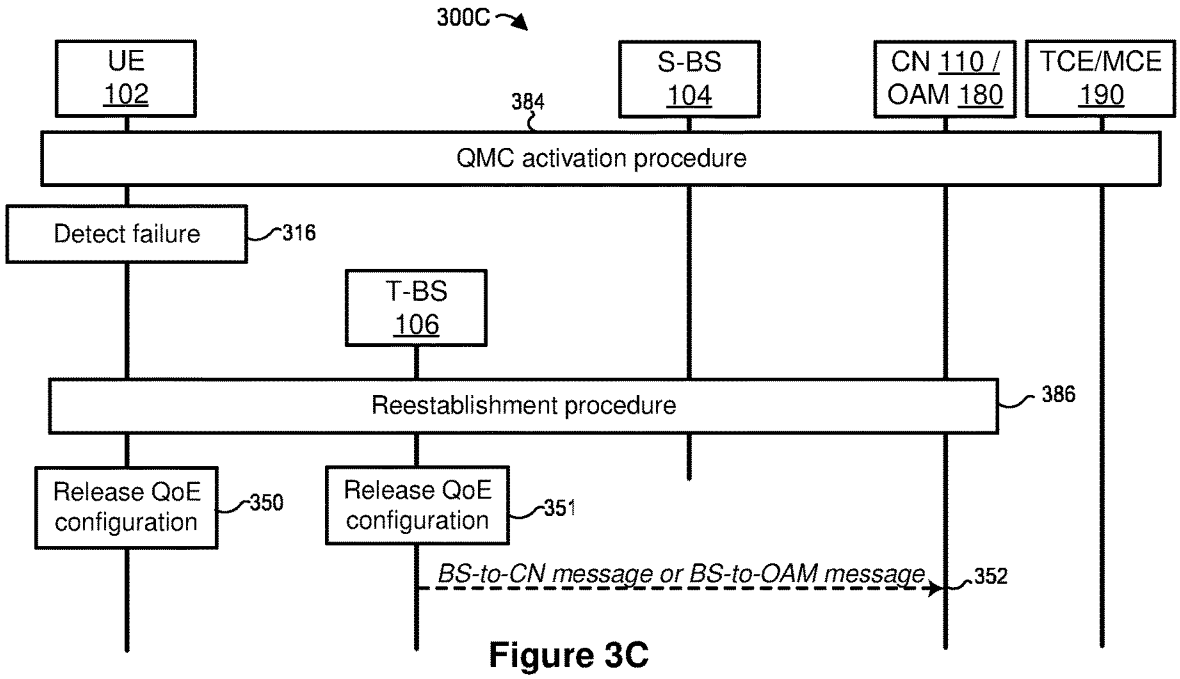
FIG. 3C illustrates a scenario similar to that of FIG. 3A, but in which the target node releases the QoE configuration in response to performing the reestablishment procedure.

Referring next to FIG. 3C, a scenario 300C is similar to 300A and similarly involves an S-BS 104 and UE 102 activating QMC and reporting for the UE 102 before detecting a communication error and performing a reestablishment procedure with a T-BS 106. However, unlike scenario 300A, the T-BS 106 releases the QoE configuration(s) in response to performing the reestablishment procedure.

After performing the reestablishment procedure 386, the UE 102 and the T-BS 106 both release 350/351 their respective QoE configuration(s). The UE 102 can release 350 its QoE configuration(s) in response to the reestablishment procedure 386. In some implementations, the T-BS 106 releases 351 the QoE configuration(s) in response to determining that the T-BS 106 does not support QoE reporting or particular QoE commands. In further implementations, the T-BS 106 releases 351 the QoE configuration(s) in response to determining that the QoE configuration(s) is/are invalid. For example, the T-BS 106 may not belong to an area configured in the area configuration. In such cases, the T-BS 106 can include an indication to release the QoE configuration(s) in the RRC reconfiguration 328 during the reestablishment procedure 386, similar to event 340. In still further implementations, the T-BS 106 releases 351 the QoE configuration(s) in response to receiving a command from the CN 110 or OAM 180 during the reestablishment procedure 386. In some implementations, after releasing the QoE configuration(s), the T-BS 106 transmits 352 a message to the CN 110 or OAM 180 notifying the CN 110 or OAM 180 that the QoE configuration(s) has been released. In response to the message 352, the CN 110 or OAM 180 can release the QoE configuration(s). In other implementations, upon receiving 332 the BS-to-CN message or BS-to-OAM message during the reestablishment procedure 386, the CN 110 or OAM 180 determines that the T-BS 106 may not belong to an arca configured in the area configuration. In response to the determination, the CN 110 or OAM 180 can release the QoE configuration(s).

Figure 3D:
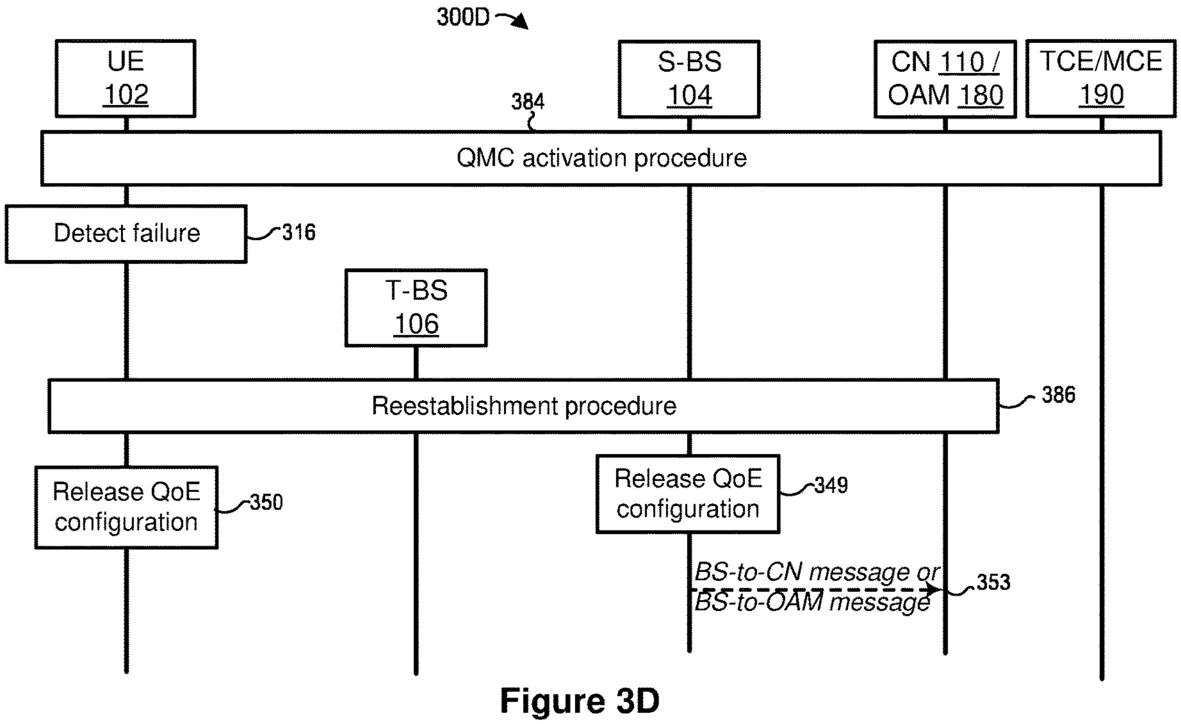
FIG. 3D illustrates a scenario similar to that of FIG. 3C, but in which the source node releases the QoE configuration in response to performing the reestablishment procedure.

Referring next to FIG. 3D, a scenario 300D is similar to 300C and similarly involves an S-BS 104 and UE 102 activating QMC and reporting for the UE 102 before detecting a communication error and performing a reestablishment procedure with a T-BS 106. However, unlike scenario 300C, the S-BS 104 releases the QoE configuration in response to performing the reestablishment procedure.

After performing the reestablishment procedure 386, the UE 102 and the S-BS 104 both release 350/349 their respective QoE configuration(s). During reestablishment procedure 386, the S-BS 104 may not forward a QoE configuration to the T-BS 106. As such, the S-BS 104 releases 349 the QoE configuration after the reestablishment procedure completes. In some implementations, the S-BS 104 does not forward the QoE configuration because the T-BS 106 does not support or is not configured for QoE reporting. In further implementations, the S-BS 104 releases 349 the QoE configuration in response to determining that the QoE configuration is invalid. In still further implementations, the S-BS 104 releases 349 the QoE configuration in response to receiving a command from the CN 110 or OAM 180 during or immediately prior to the reestablishment procedure 386. Depending on the implementation, the S-BS 104 may transmit 353 a message to the CN 110 or OAM 180 in response to releasing the QoE configuration to notify the CN 110 or OAM 180 that the QoE configuration has been released.

Figure 3E:
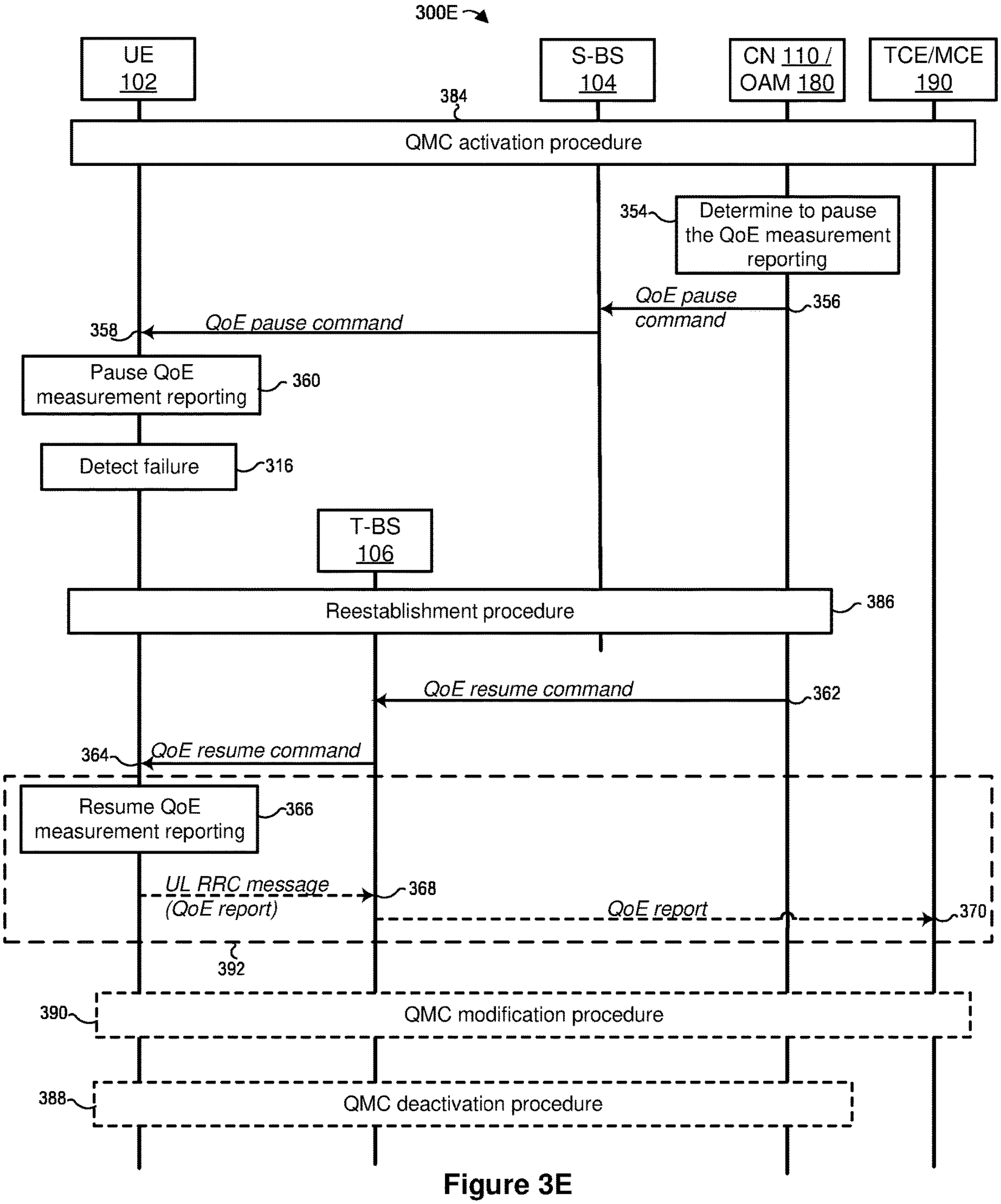
FIG. 3E illustrates a scenario similar to that of FIG. 3A, but in which the CN or OAM node commands the source base station (S-BS) to pause QoE reporting and subsequently causes the target base station (T-BS) to resume QoE reporting.

Referring next to FIG. 3E, a scenario 300E is similar to 300A and similarly involves an S-BS 104 and UE 102 activating QMC and reporting for the UE 102 before detecting a communication error and performing a reestablishment procedure with a T-BS 106. However, unlike scenario 300A, the S-BS 104 suspends the QoE reporting prior to detecting the communication error and the T-BS 106 resumes the QoE reporting after the reestablishment procedure.

After performing the QMC activation procedure 384, the CN 110 or OAM 180 determines 354 to pause the QoE measurement reporting (hereinafter referred to as QoE reporting). In some implementations (not shown), the CN 110 or OAM 180 makes the determination 354 in response to a request by the UE 102 via the S-BS 104 or in response to a request by the S-BS 104. The UE 102 may send the request to the CN 110 or OAM 180 via the S-BS 104 in response to determining to save power or in response to pausing an application to which the QoE reporting is associated. In further implementations, the S-BS 104 may send the request to the CN 110 or OAM 180 in response to receiving more than a pre-determined amount of information from one or more UEs (i.e., RAN overload). After making the determination 354, the CN 110 or OAM 180 transmits 356 a command to the S-BS 104 to pause QoE reporting (e.g., a QoE pause command). After receiving 356 the command, the S-BS 104 transmits 358 to the UE 102 the command to pause QoE reporting. The UE 102 then pauses 360 the QoE reporting.

In some implementations, the UE 102 continues QMC associated with the QoE reporting in response to or after receiving 358 the command but halts the transmission of QoE reports. In other implementations, the UE 102 pauses the QMC and/or QoE reporting in response to the command behaving as a toggle and restarts the QMC and reporting in response to receiving the command a second time. In some implementations, the CN 110 or OAM 180 can indicate in the command whether the QMC is paused at the network.

In some implementations, the S-BS 104 can transmit 358 an RRC reconfiguration including the QoE pause command to the UE 102. In response, the UE 102 can transmit (not shown) an RRC reconfiguration complete message to the S-BS 104. In some implementations, the QoE pause command is a CN-to-BS message (e.g., NGAP message or QoE Pause message). In other implementations, the QoE pause command is included in an OAM-to-BS message or a CN-to-BS message (e.g., such as an NGAP message). In such cases, the QoE pause command can be an interface IE of the OAM-to-BS message or CN-to-BS message.

In some implementations, the UE 102 pauses the QoE reporting for one or more (and up to all) of the QoE configuration(s) configured in the procedure 384 in response to the command 358. In such cases, the CN 110 or OAM 180 in one implementation can include one or more indications in the command 358 to instruct the UE 102 to pause the QoE reporting for individually-indicated QoE configuration(s), or alternatively include a single indicator to pause QoE reporting for all QoE configurations at the UE. The indication(s) can be the ID(s) associated with the QoE configuration(s) as described above. In other implementations, the CN 110 or QAM 180 includes the indication(s) in the OAM-to-BS message or CN-to-BS message 356. In such cases, the S-BS 104 can determine QoE configuration ID(s) associated with the one or more QoE configuration(s) in accordance with the indication(s) (e.g., the ID(s)) as described above. In another implementation, the CN 110 or OAM 180 does not include an indication in the command 358 to indicate to the UE 102 to pause the QoE reporting for selected QoE configuration(s). In this case, the command 358 without the indication implicitly indicates that the UE 102 should pause the QoE reporting for all of the QoE configuration(s).

After pausing 360 the QoE reporting, the UE 102 detects 316 a communication failure and performs a reestablishment procedure 386 with the S-BS 104, T-BS 106, and CN 110 or OAM 180 as described in FIG. 3A. After performing the reestablishment procedure 386, the CN 110 or OAM 180 transmits 362 a QoE resume command to the T-BS 106 to resume the QoE reporting. In some implementations, the CN 110 or OAM 180 transmits 362 the QoE resume command after receiving 332 a notification from the T-BS 106 that the reestablishment procedure 386 has occurred. In other implementations, the CN 110 or OAM 180 may receive an indication from the S-BS 104 instead of or in addition to receiving 332 the indication from the T-BS 106.

In response to receiving 362 the command, the T-BS 106 transmits 364 the QoE resume command to the UE 102. In cases where the UE 102 pauses the QMC, the UE 102 resumes the QMC. In some implementations, the T-BS 106 transmits 364 an RRC reconfiguration including the QoE resume command to the UE 102. In response, the UE 102 can transmit (not shown) a RRC reconfiguration complete message to the T-BS 106. In some implementations, the UE 102 subsequently resumes 366 QoE reporting and begins transmitting 368 uplink messages including QoE reports to the T-BS 106, which in turn transmits 370 the QoE reports to the TCE/MCE 190. The events 366, 368, and 370 are collectively known in FIG. 3E as QoE reporting resume procedure 392. Depending on the implementation, the UE 102, T-BS 106, and CN 110 or OAM 180 may subsequently perform a QMC modification procedure 390 or QMC deactivation procedure 388 as described in FIGS. 3A and 3B. If the reason or condition to pause the QoE reporting as described above is still valid, the CN 110 or OAM 180 may refrain from transmitting 362 the command. Otherwise, the CN 110 or OAM 180 can determine to transmit 362 the command. For example, the CN 110 or OAM 180 makes the determination in response to a request by the UE 102 via the S-BS 104 or in response to a request by the S-BS 104. The UE 102 may send the request to the CN 110 or OAM 180 via the S-BS 104 in response to determining not to save power or in response to resuming an application to which the QoE reporting is associated.

In some scenarios and implementations, the CN 110 or OAM 180 receives from the T-BS 106 an indication that the T-BS 106 is overloaded before the reestablishment procedure 386 completes. In such cases, the CN 110 or OAM 180 refrains from transmitting 362 the command to the T-BS 106. After the CN 110 or OAM 180 receives from the T-BS 106 an indication that the T-BS 106 is no longer overloaded, the CN 110 or OAM 180 can determine to transmit 362 the command to the T-BS 106.

In some implementations, the QoE resume command is a CN-to-BS message (e.g., NGAP message or QoE Resume message). In other implementations, the QoE resume command is included in an OAM-to-BS message or a CN-to-BS message (e.g., such as an NGAP message). In such cases, the QoE resume command can be an interface IE of the OAM-to-BS message or CN-to-BS message.

In some implementations, the UE 102 resumes the QoE reporting for all of the QoE configuration(s) configured in the procedure 384 in response to the command 362. In such cases, the CN 110 or OAM 180 in one implementation can include an indication in the command 362 to indicate to the UE 102 to resume the QoE reporting for all of the QoE configuration(s). The indication can be the ID(s) associated with the QoE configuration(s) as described above. In another implementation, the CN 110 or OAM 180 does not include an indication in the command 358 to indicate to the UE 102 to resume the QoE reporting for all of the QoE configuration(s). In this case, the command 362 without the indication indicates to the UE 102 to resume the QoE reporting for all of the QoE configuration(s).

In other implementations, the UE 102 resumes the QoE reporting for one or more of the QoE configuration(s) in response to the command 362. In such cases, the CN 110 or OAM 180 can include an indication in the command 362 to indicate to the UE 102 to resume the QoE reporting for the one or more QoE configuration(s). The indication can be the ID(s) associated with the one or more QoE configuration(s) as described above. Alternatively, the CN 110 or QAM 180 includes the indication in the OAM-to-BS message or CN-to-BS message 362. In this case, the T-BS 106 can determine QoE configuration ID(s) associated with the one or more QoE configuration(s) in accordance with the indication (e.g., the ID(s)) as described above. The T-BS 106 then includes the QoE configuration ID(s) in the RRC reconfiguration message 364. Thus, the UE 102 can determine to resume the QoE reporting for the one or more QoE configuration(s) in accordance with the QoE configuration ID(s).

Figure 3F:
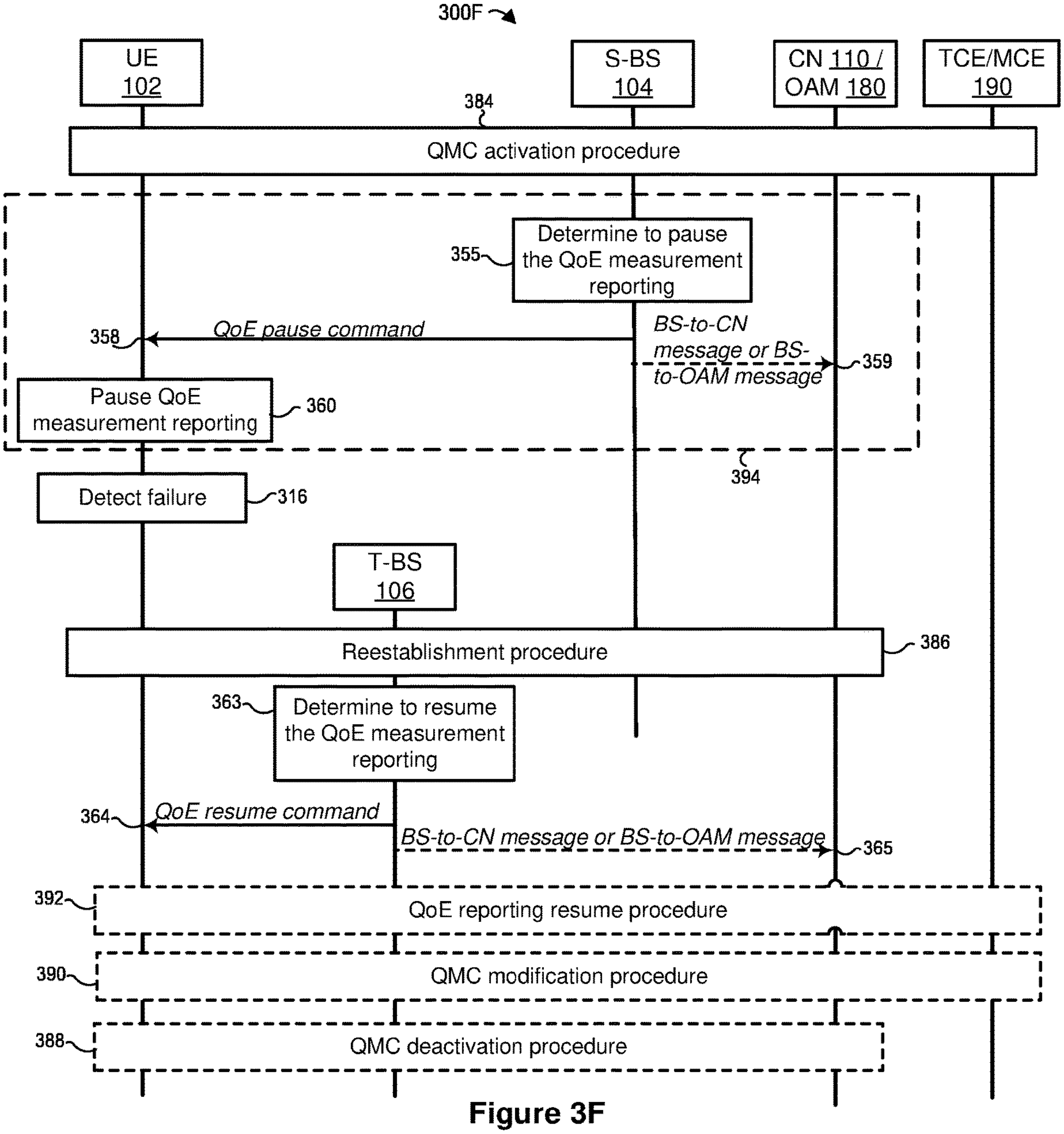
FIG. 3F illustrates a scenario similar to that of FIG. 3E, but in which the S-BS determines to pause QoE reporting and the T-BS later determines to resume QoE reporting.

Referring next to FIG. 3F, a scenario 300F is similar to 300E and similarly involves an S-BS 104 and UE 102 activating QMC and reporting for the UE 102 before detecting a communication error and performing a reestablishment procedure with a T-BS 106. However, unlike scenario 300E, the base stations 104 and 106 make the decisions to pause or resume QoE reporting independent of the CN 110 or OAM 180.

After performing the QMC activation procedure 384, the S-BS 104 determines 355 to pause the QoE reporting. In some implementations, the S-BS 104 may make the determination 355 after receiving a request from the UE 102. The UE 102 may send the request to the S-BS 104 in response to determining to save power. In further implementations, the S-BS 104 may make the determination 355 in response to receiving more than a pre-determined amount of information from one or more UEs (i.e., RAN overload). In response to determining 355 to pause the QoE reporting, the S-BS 104 transmits 358 a QoE pause command to the UE 102 to pause the QoE reporting. In some implementations, the command includes a measConfigAppLayer information element including a QoE pause command to temporarily pause the QoE reporting. In such implementations, the UE 102 may continue to perform QMC and only stop the reporting. Alternatively, the UE 102 also pauses the QMC in response to the QoE pause command. After receiving the command, the UE 102 pauses 360 the QoE reporting. In some implementations, the S-BS 104 may transmit 359 a message to the CN 110 or OAM 180 notifying the CN 110 or OAM 180 that QoE reporting is paused. The events 355, 358, 359, and 360 are collectively known in FIG. 3F as QMC pause procedure 394.

After pausing 360 the QoE reporting, the UE 102 detects 316 a communication failure and performs a reestablishment procedure 386 with the S-BS 104, T-BS 106, and CN 110 or OAM 180 as described in FIG. 3A. The S-BS 104 can include an indication of a pause status for a QoE configuration associated with the QoE reporting in the Retrieve UE Context Response message during the reestablishment procedure 386, similar to event 323 of FIG. 3G below. After or in response to performing the reestablishment procedure 386, the T-BS 106 determines 363 to resume the QoE reporting and transmits 364 a QoE resume command to the UE 102 to resume QoE reporting. In some implementations, the T-BS 106 then transmits a message to the CN 110 or OAM 180 to notify the CN 110 or OAM 180 that QoE reporting is resumed. The UE 102, T-BS 106, and TCE/MCE 190 then perform a QoE reporting resume procedure 392 as described in FIG. 3E. Similarly, the UE 102, T-BS 106, and CN 110 or OAM 180 may then perform a QMC modification procedure 390 and/or a QMC deactivation procedure 388 as described in FIGS. 3A and 3B.

Figure 3G:
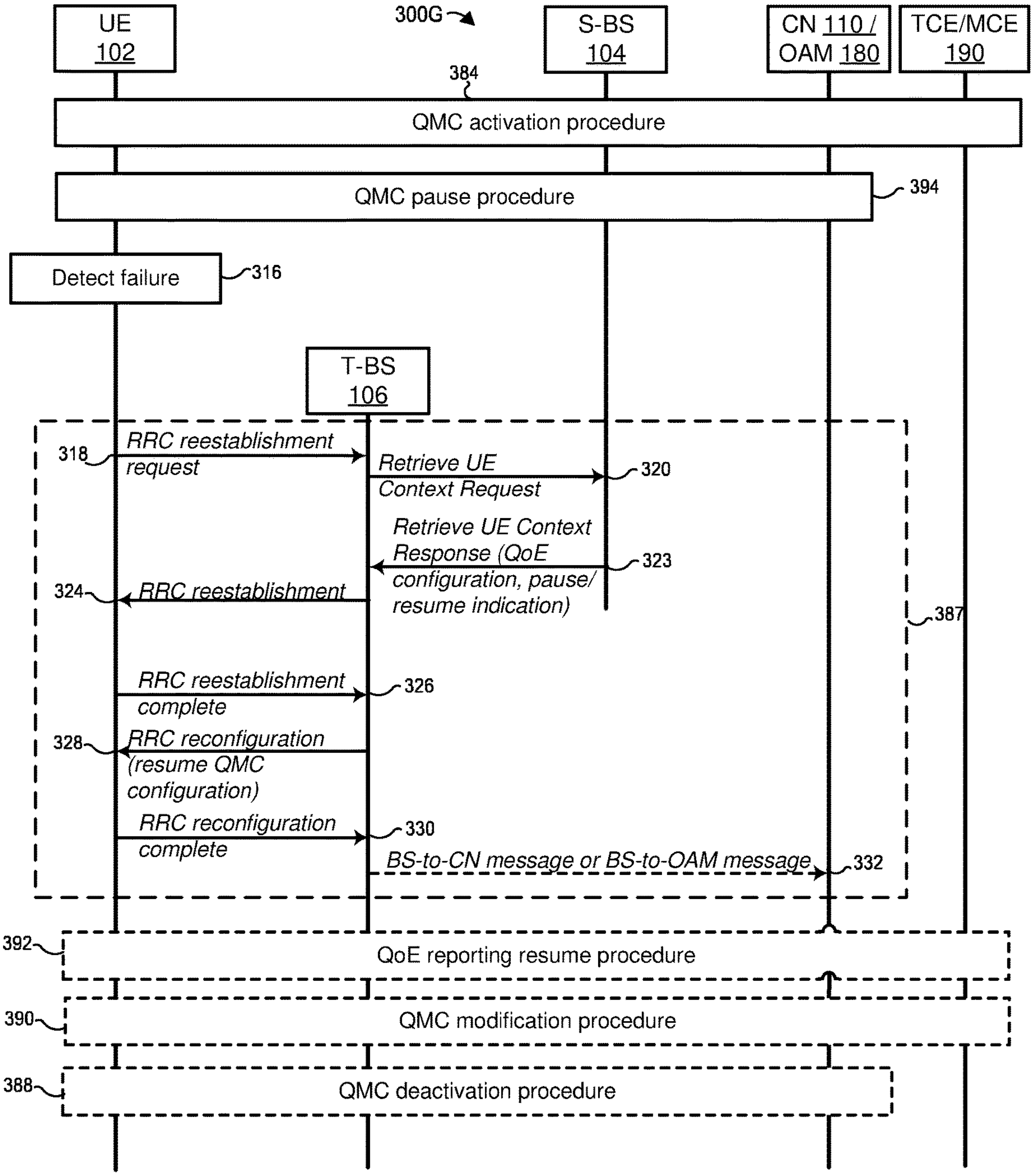
FIG. 3G illustrates a scenario similar to that of FIG. 3F, but in which the S-BS transmits an indication of the pause status for QoE reporting alongside a configuration for the QoE reporting.

Referring next to FIG. 3G, a scenario 300G is similar to 300E and similarly involves an S-BS 104 and UE 102 activating QMC and reporting for the UE 102 before detecting a communication error and performing a reestablishment procedure with a T-BS 106. However, unlike scenario 300E, the T-BS 106 retrieves an indication of a pause status for a QoE configuration during the reestablishment procedure.

After detecting 316 a communication failure, the UE 102 transmits 318 a reestablishment request to the T-BS 106. The T-BS 106 then transmits 320 a request to retrieve a context for the UE 102 from the S-BS 104. The S-BS 104 then responds 323 with a QoE configuration, configured in the QMC activation procedure 384, and an indication that the QoE configuration is paused. After retrieving 320/322 the context for the UE 102, the T-BS 106 transmits 324 a reestablishment message to the UE 102, which responds 326 with an acknowledgment that reestablishment is complete. In some implementations, the T-BS 106 then transmits 328 a radio resource (e.g., RRC) reconfiguration message to the UE 102, the message including an indication to resume QoE reporting for the QoE configuration. In response, the UE 102 transmits 330 a message indicating that radio resource reconfiguration is complete to the T-BS 106, which notifies the CN 110 or OAM 180 by transmitting 332 a message to the CN 110 or OAM 180. Depending on the implementation, the UE 102, T-BS 106, and/or CN 110 or OAM 180 may perform any or all of a QoE reporting resume procedure 392, a QMC modification procedure 390, and/or a QMC deactivation procedure 388 as described above.

Figure 4A:
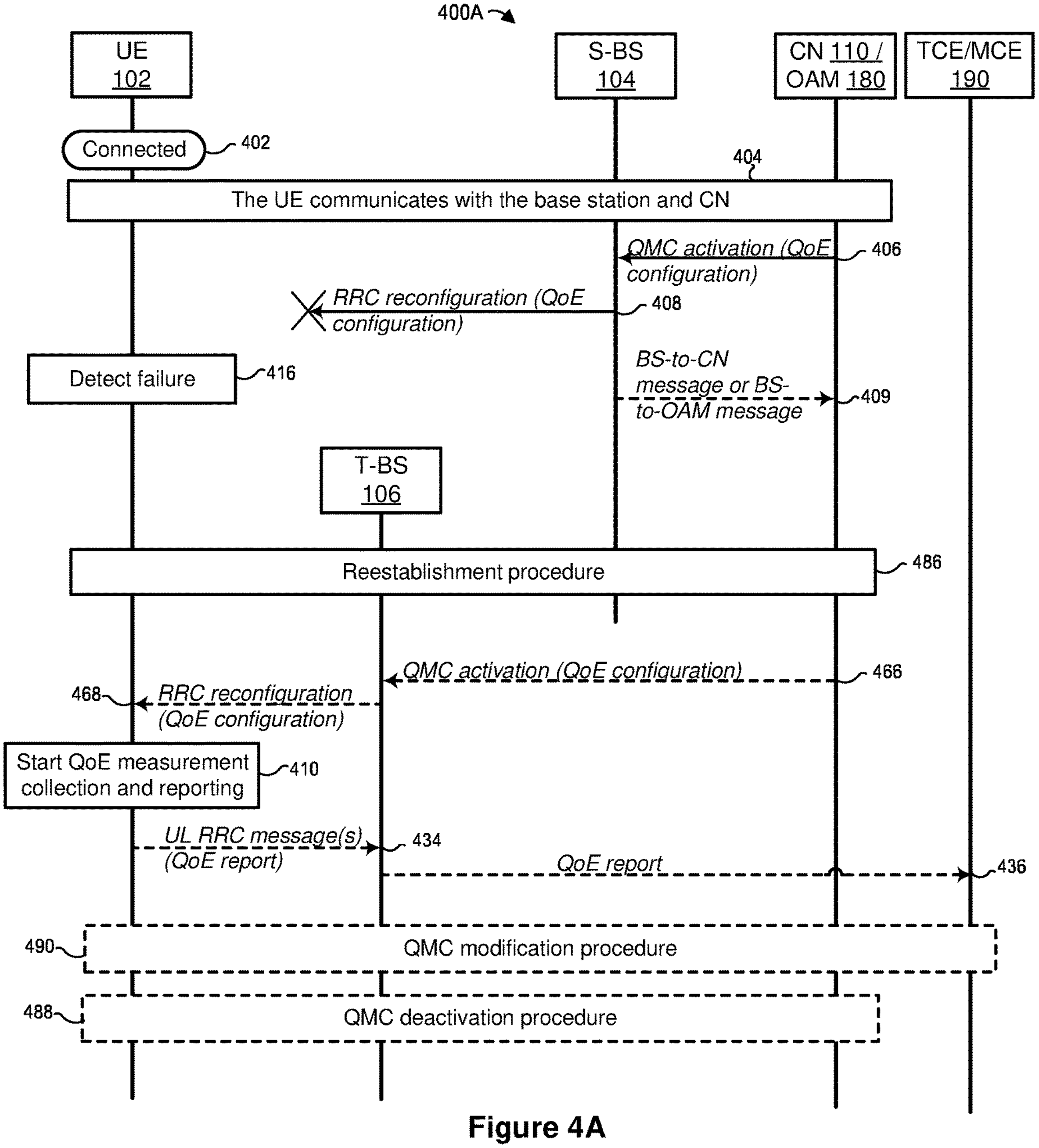
FIG. 4A illustrates a scenario similar to that of FIG. 3A, but in which the S-BS attempts and fails to transmit a QoE configuration to the UE to activate QoE reporting but is unable to, and the T-BS does so after the reestablishment procedure.
Figure 4B:
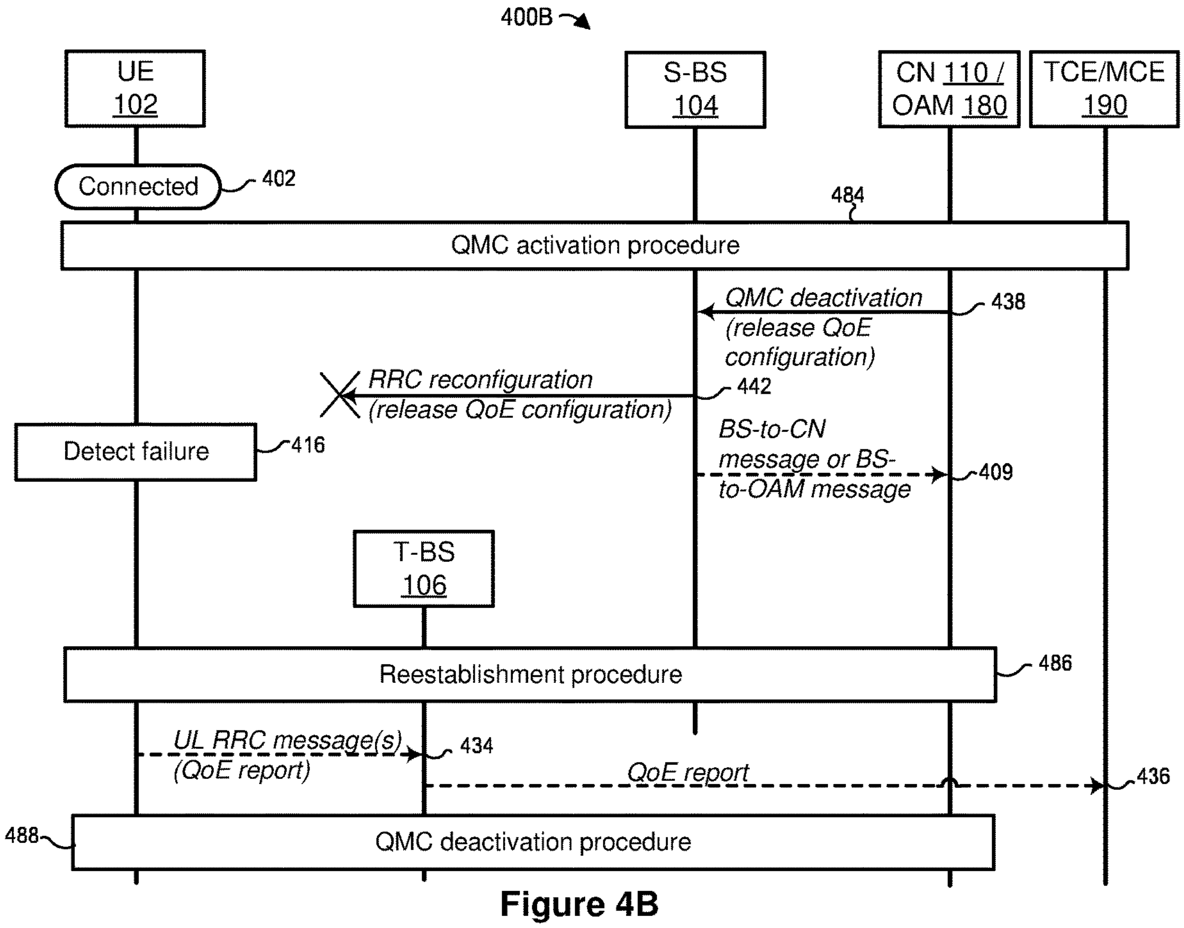
FIG. 4B illustrates a scenario similar to that of FIG. 4A, but in which the S-BS attempts and fails to transmit a command to release a QoE configuration.
Figure 4C:
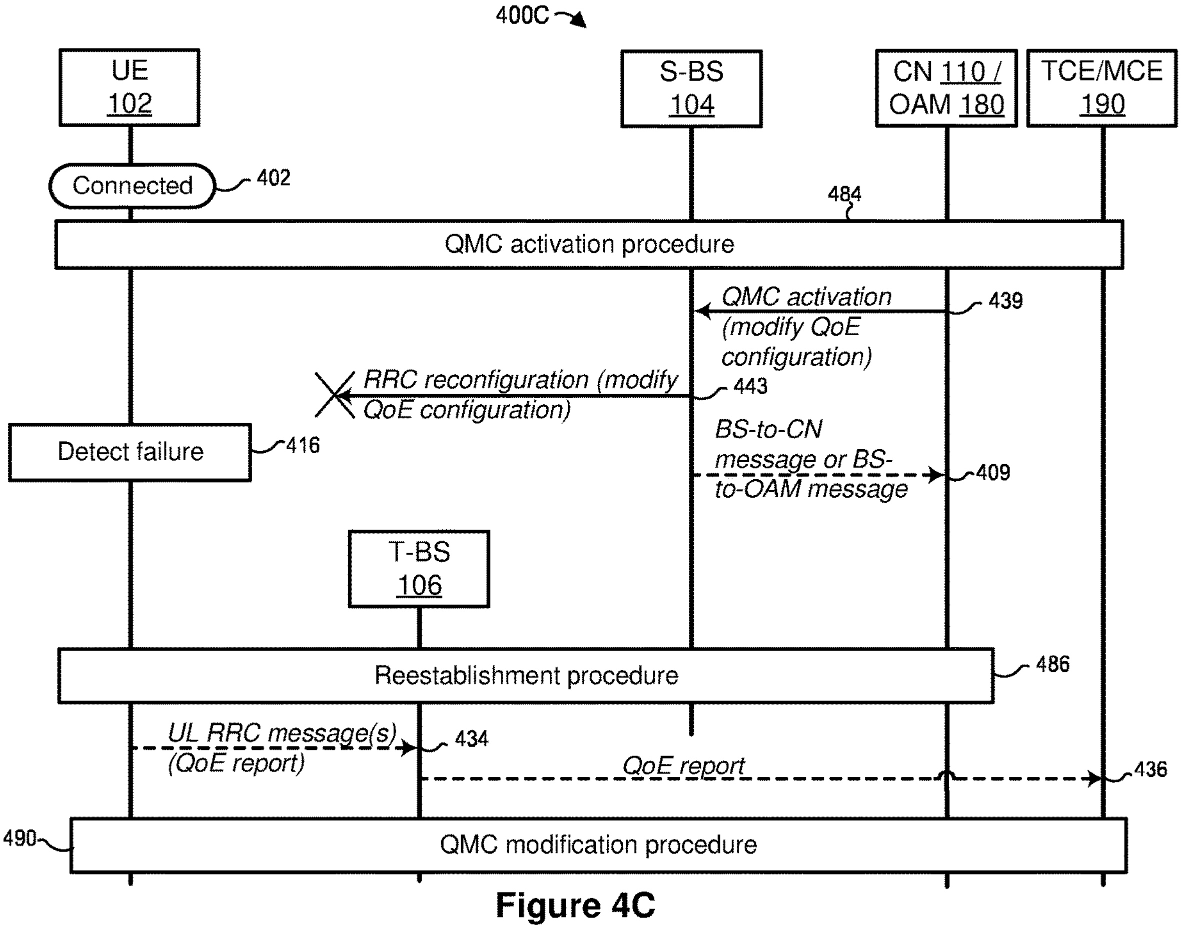
FIG. 4C illustrates a scenario similar to that of FIG. 4A, but in which the S-BS attempts and fails to transmit a command to modify a QoE configuration.

FIGS. 4A-4C are message sequences of example scenarios in which a RAN facilitates Quality of Experience (QoE) measurement collection (QMC) and reporting for a UE and a CN or OAM node during and/or after a communication failure. Generally speaking, equivalent events in FIGS. 4A-4C are labeled with similar reference numbers (e.g., event 386 in FIGS. 3A-3G is similar to event 486 in FIGS. 4A-4C) with differences discussed below where appropriate. With the exception of the differences shown in the figures and discussed below, any of the alternative implementations discussed with respect to a particular event (e.g., for messaging and processing) may apply to events labeled with similar reference numbers in other figures and also to both integrated and distributed base stations.

Referring now to FIG. 4A, a scenario 400A is similar to 300A and similarly involves an S-BS 104 and UE 102 communicating before detecting a communication error and performing a reestablishment procedure with a T-BS 106. However, unlike scenario 300A, the S-BS 104 is unable to transmit the initial QoE configuration to activate QMC and QoE reporting.

After or while communicating 404 with the S-BS 104 and the UE 102, the CN 110 or OAM 180 transmits a command to the S-BS 104 to activate QMC and QoE reporting, the command including a QoE configuration. In response, the S-BS 104 attempts to transmit 408 the QoE configuration to the UE 102 in a reconfiguration message (e.g., an RRC reconfiguration message). However, the UE 102 does not receive the configuration and subsequently detects 416 communication failure. In some implementations, the UE 102 detects 416 the communication failure because the UE 102 does not receive the configuration. Depending on the implementation, the S-BS 104 transmits 409 a message to the CN 110 or OAM 180 indicating that communication with the UE 102 has failed.

After detecting 416 failure, the UE 102, S-BS 104, T-BS 106, and CN 110 or OAM 180 perform a reestablishment procedure 486. In some implementations, the S-BS 104 retains the QoE configuration and the T-BS 106 retrieves the QoE configuration directly from the S-BS 104 during the reestablishment procedure 486.

In still other implementations, the T-BS 106 transmits a message to the CN 110 or OAM 180 as part of the reestablishment procedure 486, notifying the CN 110 or OAM 180, similar to event 332. In response, the CN 110 or OAM 180 transmits 466 the QoE configuration in a QMC activation command, allowing the T-BS 106 to retrieve the QoE configuration from the CN 110 or OAM 180. Depending on the implementation, the T-BS 106 may retrieve the QoE configuration from both the S-BS 104 and the CN 110 or OAM 180, or the T-BS 106 may retrieve the QoE configuration from the S-BS 104 and subsequently retrieve or receive a second QoE configuration from the CN 110 or OAM 180.

After receiving 466 the QoE configuration from the CN 110 or OAM 180, the T-BS 106 transmits 468 the QoE configuration to the UE 102 in an RRC reconfiguration message, similar to event 308. In response, the UE 102 starts 410 a new session for QoE measurement collection and reporting. The UE 102 can transmit (not shown) an RRC reconfiguration complete message to the T-BS 106 in response to the RRC reconfiguration message. The UE 102 then transmits 434 uplink messages containing QoE reports to the T-BS 106, which in turn transmits the QoE reports to the TCE/MCE 190. Depending on the implementation, the UE 102, T-BS 106, and CN 110 or OAM 180 perform a QMC modification procedure 490 and/or a QMC deactivation procedure 488 similar to QMC modification procedure 390 and/or QMC deactivation procedure 388 as described in FIGS. 3A and 3B.

Referring next to FIG. 4B, a scenario 400B is similar to 400A and similarly involves an S-BS 104 and UE 102 communicating before detecting a communication error and performing a reestablishment procedure with a T-BS 106. However, unlike scenario 400A, the S-BS 104 attempts to transmit a command to the UE 102 to release the QoE configuration.

The UE 102, S-BS 104, and CN 110 or OAM 180 successfully perform a QMC activation procedure 484 similar to QMC activation procedure 384 described in FIG. 3A above. After the activation procedure 484, the CN 110 or OAM 180 determines to deactivate QMC and QoE reporting, and transmits 438 a command to release a QoE configuration to the S-BS 104. The S-BS 104 attempts to transmit 442 an RRC reconfiguration message to release the QoE configuration to the UE 102, similar to event 340. However, the UE 102 does not receive the message and subsequently detects 416 communication failure. In some implementations, the UE 102 detects 416 the communication failure because the UE 102 does not receive the message. Depending on the implementation, the S-BS 104 transmits 409 a message to the CN 110 or OAM 180 indicating that communication with the UE 102 has failed. In other implementations, the T-BS 106 may transmit a message to the CN 110 or OAM 180 as part of a reestablishment procedure 486, similar to event 332.

In response to detecting 416 failure, the UE 102 performs a reestablishment procedure 486 with the T-BS 106, the S-BS 104, and the CN 110 or OAM 180 as described with respect to FIG. 4A above. In some implementations, the T-BS 106 retrieves the command to release the QoE configuration along with the QoE configuration in a Retrieve UE Context Response message from the S-BS 104 during the reestablishment procedure 486. In further implementations, in response to or after receiving the message (e.g., similar to event 332) during the reestablishment procedure 486, the CN 110 or OAM 180 performs a QMC deactivation procedure 488, similar to QMC deactivation procedure 388 described in FIG. 3A. After performing the reestablishment procedure 486 and before receiving the command to release the QoE configuration, the UE 102 can continue or resume QoE reporting, transmitting 434 UL message(s) to the T-BS 106 including one or more QoE reports. The T-BS 106 then transmits 436 the one or more QoE reports to the TCE/MCE 190.

Referring next to FIG. 4C, a scenario 400C is similar to 400B and similarly involves an S-BS 104 and UE 102 communicating before detecting a communication error and performing a reestablishment procedure with a T-BS 106. However, unlike scenario 400B, the S-BS 104 attempts to transmit a command to the UE 102 to modify the QoE configuration.

After performing a QMC activation procedure 484 with a UE 102 and an S-BS 104, the CN 110 or OAM 180 transmits a message to the S-BS 104 including an indication to modify a QoE configuration. In response, the S-BS 104 attempts to transmit 443 an RRC reconfiguration message to the UE 102 to command the UE 102 to modify the QoE configuration, similar to event 341. However, the UE 102 does not receive the message and subsequently detects 416 communication failure. In some implementations, the UE 102 detects 416 the communication failure because the UE 102 does not receive the message. Depending on the implementation, the S-BS 104 transmits 409 a message to the CN 110 or OAM 180 indicating that communication with the UE 102 has failed. In other implementations, the T-BS 106 transmits a message to the CN 110 or OAM 180 as part of a reestablishment procedure 486, similar to event 332.

In response to detecting 416 failure, the UE 102 performs a reestablishment procedure 486 with the T-BS 106, the S-BS 104, and the CN 110 or OAM 180 as described with respect to FIG. 4A above. In some implementations, the T-BS 106 retrieves the command to modify the QoE configuration in a Retrieve UE Context Response message from the S-BS 104 during the reestablishment procedure 486. In further implementations, in response to or after receiving the message (e.g., similar to event 332) during the reestablishment procedure 486, the CN 110 or OAM 180 performs a QMC modification procedure 490, similar to QMC modification procedure 390 described in FIG. 3B. After performing the reestablishment procedure 486 and before receiving the command to modify the QoE configuration, the UE 102 can continue or resume QoE reporting, transmitting 434 UL message(s) to the T-BS 106 including one or more QoE reports. The T-BS 106 then transmits 436 the one or more QoE reports to the TCE/MCE 190.

Next, several example methods that can be implemented in a UE, a RAN, a CN, or an OAM node are discussed with reference to FIGS. 5-15. Each of these methods can be implemented using processing hardware such as one or more processors to execute instructions stored on a non-transitory computer-readable medium such as computer memory.

Referring first to FIG. 5, a method 500 can be implemented in a source node of a suitable RAN and includes receiving at least one QoE configuration and reference identifier, assigning configuration identifiers for the configurations, and transmitting configuration and identifiers to a target node. For clarity, the method 500 is discussed with specific reference to the RAN 105, the S-BS 104 as a source node, the T-BS 106 as a target node, the CN 110 or OAM 180 as a QoE node (e.g., a network node), and the UE 102.

At block 502, the S-BS 104 communicates with a UE 102 operating in a connected state (e.g., events 304, 384, 404, and 484 of FIGS. 3A-4C). At block 504, the S-BS 104 receives, from the CN 110 or OAM 180, at least one QoE configuration and at least one reference identifier (e.g., a reference ID) (e.g., events 306, 384, 406, and 484 for FIGS. 3A-4C). In some implementations, each reference identifier is associated with a particular QoE configuration. In further implementations, a reference identifier may refer to a group of multiple configurations. At block 506, the S-BS 104 assigns a different configuration identifier (e.g., a configuration ID) for each of the QoE configurations (e.g., events, 384, and 484 of FIGS. 3A-3G, 4B-4C). Then, at block 508, the S-BS 104 transmits the QoE configurations and the configuration identifiers to the UE 102 (e.g., events 308, 384, and 484 of FIGS. 3A-3G, 4B-4C). In some implementations, flow continues on to block 510, where the S-BS 104 receives at least one QoE report from the UE 102 in response to transmitting the QoE configurations (e.g., events 312, 384, and 484 of FIGS. 3A-3G, 4B-4C). In some implementations, the S-BS 104 receives a QoE report from the UE 102 for each of the QoE configurations. In other implementations, the S-BS 104 receives QoE reports from the UE 102 for only some of the QoE configurations. In still other implementations, the S-BS 104 receives fewer QoE reports from the UE 102 than QoE configurations, but at least some of the QoE reports correspond with multiple QoE configurations.

At block 512, the S-BS 104 then receives a first interface message from the T-BS 106 requesting a context for the UE 102 (e.g., a Retrieve UE Context Request message) (e.g., events 320, 386, and 486 of FIGS. 3A-4C). In response, at block 514, the S-BS 104 then transmits, to the T-BS 106, a second interface message including the QoE configurations, reference identifiers, and configuration identifiers (e.g., a Retrieve UE Context Response message) (e.g., events 322, 323, 386, and 486 of FIGS. 3A-4C). In some implementations, the second interface message further includes information about the association between the reference identifiers and the configuration identifiers.

In this manner, an S-BS of a RAN receives and assigns identifiers for QoE configurations that are used for QMC and/or QoE reporting before transmitting, in response to a request from a T-BS of the RAN, the identifiers and/or identifying information about the QoE configuration to the T-BS.

Referring next to FIG. 6, a method 600 can be implemented in a target node of a suitable RAN and includes receiving at least one QoE configuration, reference identifier, and configuration identifier, and subsequently receiving an indication to release or modify a QoE configuration using a reference identifier. For clarity, the method 600 is discussed with specific reference to the RAN 105, the S-BS 104 as a source node, the T-BS 106 as a target node, the CN 110 or OAM 180 as a QoE node (e.g., a network node), and the UE 102.

At block 602, the T-BS 106 receives a reestablishment request message from a UE 102 operating in a connected state (e.g., events 318, 386, and 486 of FIGS. 3A-4C). In response, at block 604, the T-BS 106 transmits a first interface message to an S-BS 104 (e.g., a Retrieve UE Context Request message) (e.g., events 320, 386, and 486 of FIGS. 3A-4C). At block 606, the T-BS 106 then receives, from the S-BS 104, a second interface message including at least one QoE configuration, at least one reference identifier (e.g., a reference ID), and at least one configuration identifier (e.g., a configuration ID) for the UE 102 (e.g., a Retrieve UE Context Response message) (e.g., events 322, 323, 386, and 486 of FIGS. 3A-4C). In some implementations, the second interface message includes information about the association between the reference identifiers and the configuration identifiers.

Next, at block 608, the T-BS 106 transmits a reestablishment message to the UE 102 (e.g., events 324, 386, and 486 of FIGS. 3A-4C) before transmitting, at block 610, a radio resource reconfiguration message (e.g., an RRC Reconfiguration message) (e.g., events 328, 386, and 486 of FIGS. 3A-4C). In some implementations, the flow then proceeds to any or all of blocks 612, 614, and 616. At block 612, the T-BS 106 receives, from the CN 110 or OAM 180, a QoE message including a reference identifier (e.g., events 338, 339, 388, 390, 488, or 490 of FIGS. 3A-4C). Depending on the implementation, the message further includes a command to release or modify a QoE configuration based on the reference identifier. At block 614, the T-BS 106 identifies a configuration identifier corresponding to the received reference identifier (e.g., events 347, 388, 390, 488, or 490 for FIGS. 3A-4C). In some implementations, the configuration identifiers and the reference identifiers are mapped one to one.

At block 616, the T-BS 106 transmits a downlink radio resource message (e.g., a DL RRC message) including the identified configuration identifier to release or modify the corresponding QoE configuration (e.g., events 340, 341, 388, 390, 488, or 490 for FIGS. 3A-4C). In some implementations, the T-BS 106 determines that a QoE configuration is invalid. For example, the T-BS 106 may not belong to an area configured in the area configuration or may otherwise not support the QoE operations. In response, the flow may skip from block 610 directly to block 616 and the T-BS 106 transmits a downlink radio resource message releasing or modifying the QoE to the UE 102 in response to the determination that the QoE configuration is invalid.

Referring next to FIG. 7, a method 700 can be implemented in a source node of a suitable RAN and includes determining whether to include an indication to pause or resume a QoE configuration based on whether the S-BS 104 has suspended QoE reporting. For clarity, the method 700 is discussed with specific reference to the RAN 105, the S-BS 104 as a source node, the T-BS 106 as a target node, the CN 110 or OAM 180 as a QoE node (e.g., a network node), and the UE 102.

At block 702, the S-BS 104 communicates with a UE operating in a connected state (e.g., events 304, 384, 404, and 484 of FIGS. 3A-4C). At block 704, the S-BS 104 transmits a QoE configuration to the UE 102 to activate QMC and/or QoE reporting (e.g., events 306, 384, and 484 of FIGS. 3A-3G and 4B-4C). In some implementations, flow may continue to block 706, in which the S-BS 104 receives a QoE report from the UE 102 in response to transmitting the QoE configuration (e.g., events 312, 384, and 484 of FIGS. 3A-3G and 4B-4C). At block 708, the S-BS 104 receives a first interface message from the T-BS 106 requesting a context for the UE 102 operating in the connected state (e.g., a Retrieve UE Context Request message) (e.g., events 320, 386, and 486 of FIGS. 3A-4C). In response, at block 710, the S-BS 104 includes the QoE configuration in a second interface message (e.g., a Retrieve UE Context Response message) (e.g., events 322, 323, 386, and 486 of FIGS. 3A-4C).

Next, at block 712, the S-BS 104 makes a determination as to what to include in the second interface message based on whether the S-BS 104 has previously caused the UE 102 to suspend QoE reporting for the QoE configuration. If so, the flow continues on to block 714 and 718. At block 714, the S-BS 104 includes an indication that the QoE reporting is paused in the second interface message (e.g., event 323 of FIG. 3G). If the S-BS 104 has not caused the UE 102 to suspend QoE reporting, then depending on the implementation the flow may continue to blocks 716 and 718 or may continue directly to block 718. At block 716, the S-BS 104 includes an indication that the QoE reporting is resumed in the second interface message (e.g., events 386 and 323 of FIGS. 3F-3G). At block 718, the S-BS 104 transmits the second interface message to the T-BS 106 (e.g., events 386 and 323 of FIGS. 3F and 3G).

Figure 8:
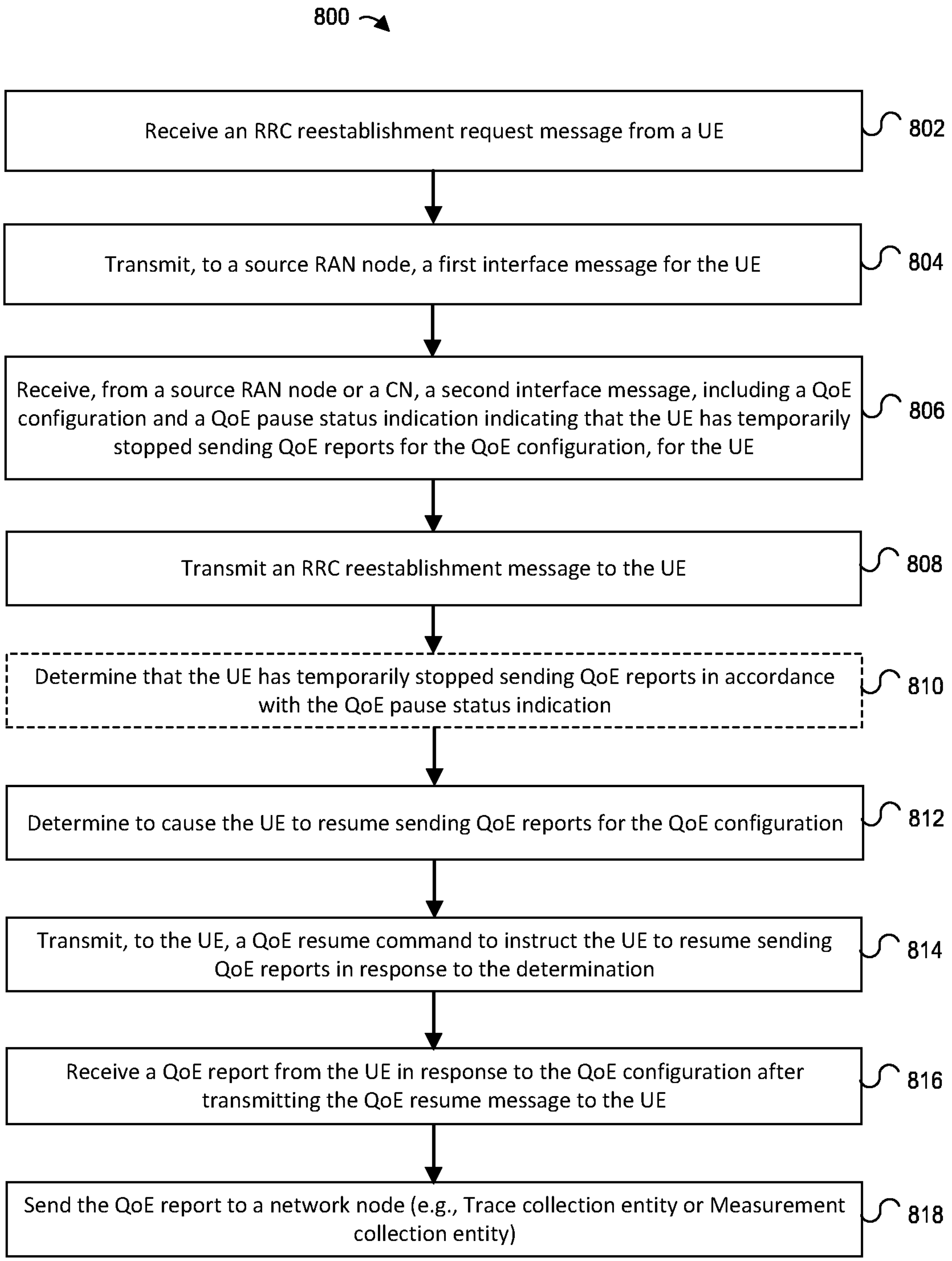
FIG. 8 is a flow diagram of an example method for determining to receive a pause status indication during a reestablishment process and subsequently resuming QoE reporting for a configuration in the UE, implemented in a target BS.

Referring next to FIG. 8, a method 800 can be implemented in a target node of a suitable RAN and includes receiving a pause status indication during a reestablishment process and subsequently resuming QoE reporting for a configuration in the UE. For clarity, the method 800 is discussed with specific reference to the RAN 105, the S-BS 104 as a source node, the T-BS 106 as a target node, the CN 110 or OAM 180 as a QoE node (e.g., a network node), and the UE 102.

At block 802, the T-BS 106 receives a reestablishment request message from the UE 102 (e.g., events 318, 386, and 486 of FIGS. 3A-4C). At block 804, the T-BS 106 transmits a first interface message to the S-BS 104 and/or the CN 110 or OAM 180, requesting a context for the UE 102 (e.g., a Retrieve UE Context Request message) (e.g., events 320, 386, and 486 of FIGS. 3A-4C). In some implementations, the T-BS 106 transmits the first interface message directly to the CN 110 or OAM 180. In further implementations, the T-BS 106 transmits the first interface message to the CN 110 or OAM 180 by way of the S-BS 104.

In response, at block 806, the T-BS 106 receives a second interface message from the S-BS 104 and/or the CN 110 or OAM 180 (e.g., a Retrieve UE Context Response message) (e.g., events 322, 323, 386, and 486 of FIGS. 3A-4C). Depending on the implementation, the second interface message includes a QoE configuration and/or an indication that the QoE configuration is at least temporarily suspended or paused. At block 808, the T-BS 106 then transmits a reestablishment message to the UE 102 (e.g., events 324, 386, and 486 of FIGS. 3A-4C). In implementations in which the second interface message includes an indication of the QoE configuration pause status, flow continues to block 810. At block 810, the T-BS 106 determines that the UE 102 has temporarily suspended or paused transmitting QoE reports in accordance with the indication.

At block 812, the T-BS 106 determines to resume QoE reporting for the QoE configuration at the UE 102 (e.g., events 362/363 of FIGS. 3E-3F). In some implementations, the determination is in response to an indication to resume QoE reporting from the CN 110 or OAM 180. In other implementations, the determination is automatic and/or in response to receiving the indication that QoE reporting is paused. At block 814, the T-BS 106 transmits, to the UE 102, a command to resume QoE reporting (e.g., event 364 of FIGS. 3E-3F). At block 816, the T-BS 106 receives one or more QoE reports from the UE 102 (e.g., events 368 and 392 of FIGS. 3E-3F) and subsequently, at block 820, transmits the QoE reports to a network node such as TCE/MCE 190 (e.g., events 370 and 392 of FIGS. 3E-3F).

Referring next to FIG. 9, a method 900 can be implemented in a suitable RAN and includes receiving at least one QoE configuration and reference identifier, assigning configuration identifiers, and transmitting the configuration and configuration identifiers to the UE. For clarity, the method 900 is discussed with specific reference to the RAN 105, the S-BS 104 as a source node, the T-BS 106 as a target node, the CN 110 or OAM 180 as a QoE node (e.g., a network node), and the UE 102.

At block 902, the RAN 105 communicates with a UE 102 operating in a connected state (e.g., events 304, 384, 404, and 484 of FIGS. 3A-4C). At block 904, the RAN 105 receives, from a QoE node such as CN 110 or OAM 180, at least one QoE configuration and at least one reference identifier (e.g., events 306, 384, 406, and 484 of FIGS. 3A-4C). In some implementations, each reference identifier is associated with a particular QoE configuration. In other implementations, each reference identifier is associated with multiple QoE configurations and/or a group of QoE configurations. At block 906, the RAN 105 assigns a different configuration identifier for each of the QoE configurations (e.g., events 307, 394, and 484 of FIGS. 3A-3G and 4B-4C), and, at block 908, the RAN 105 transmits each configuration and configuration identifier to the UE 102 (e.g., events 308, 384, and 484 of FIGS. 3A-3G and 4B-4C).

In some implementations, flow continues to block 910, where the RAN 105 receives at least one QoE report from the UE 102 in response to transmitting the QoE configuration (e.g., events 312, 384, and 484 of FIGS. 3A-3G and 4B-4C). At block 912, the RAN 105 then performs a reestablishment procedure with the UE 102. At block 914, in response to performing the reestablishment procedure, the RAN 105 determines to release a QoE configuration or group of QoE configurations (e.g., events 338, 388, 351, 349, and 488 of FIGS. 3A-4B). Depending on the implementation, the RAN 105 may make the determination in response to determining that a base station of the RAN 105 does not support QoE reporting or the RAN 105 may make the determination in response to receiving a command from the CN 110 or OAM 180. In some implementations, the flow continues to block 916, where the RAN 105 transmits a downlink message to the UE 102 (e.g., a DL RRC message) including at least one configuration identifier to release the QoE configuration or group of QoE configurations in response to the determination to release a QoE configuration (e.g., events 340, 388, and 488 of FIGS. 3A-3B and 3E-4B).

Referring next to FIG. 10, a method 1000 can be implemented in a suitable RAN and includes determining to suspend or resume QoE reporting for a QoE configuration during or after a reestablishment procedure. For clarity, the method 1000 is discussed with specific reference to the RAN 105, the S-BS 104 as a source node, the T-BS 106 as a target node, the CN 110 or OAM 180 as a QoE node (e.g., a network node), and the UE 102.

At block 1002, the RAN 105 communicates with a UE 102 operating in a connected state via an S-BS 104 of the RAN 105 (e.g., events 304, 384, 404 and 484 of FIGS. 3A-4C). At block 1004, the RAN 105 transmits a QoE configuration to the UE 102 to cause the UE 102 to begin QMC and/or QoE reporting to the RAN 105 (e.g., events 308, 384, and 484 of FIGS. 3A-3G and 4B-4C). In some implementations, the flow continues to either or both of blocks 1006 and 1008. At block 1006, the RAN 105 receives a QoE report from the UE 102 in response to transmitting the QoE configuration (e.g., events 312, 384, and 484 of FIGS. 3A-3G and 4B-4C). At block 1008, the RAN 105 transmits, to the UE 102, a command to temporarily suspend QoE reporting at the UE 102 (e.g., events 358 and 394 of FIGS. 3E-3G). At block 1010, the RAN 105 performs a reestablishment procedure with the UE 102 to reestablish a connection between a T-BS 106 of the RAN 105 and the UE 102 (e.g., events 386, 387, and 486 of FIGS. 3A-4C). At block 1012, the RAN 105 then determines to perform a QoE reporting operation for the QoE configuration during or after the reestablishment procedure (e.g., events 338, 339, 386, 388, 390, 362, 363, 466, 486, 488, or 490 of FIGS. 3A-4C). Depending on the implementation, the QoE reporting operation may be a pause operation or a resume operation. In some implementations, the determination is in response to receiving a command to perform the operation from the CN 110 or OAM 180. In further implementations, the determination is in response to the T-BS 106 of the RAN 105 receiving an indication of the status of the QoE reporting from the S-BS 104.

Referring next to FIG. 11, a method 1100 can be implemented in a suitable UE and includes determining whether to resume or continue to suspend QoE reporting based on whether the UE receives one of a resume indication for a QoE configuration or a new QoE configuration. For clarity, the method 1100 is discussed with specific reference to the RAN 105, the S-BS 104 as a source node, the T-BS 106 as a target node, the CN 110 or OAM 180 as a QoE node (e.g., a network node), and the UE 102.

At block 1102, the UE 102 communicates with a RAN 105 while operating in a connected state (e.g., events 304, 384, 404, and 484 of FIGS. 3A-4C). At block 1104, the UE 102 receives a QoE configuration from the RAN 105 (e.g., events 308, 384, and 484 of FIGS. 3A-3G and 4B-4C). Receiving the QoE configuration causes the UE 102 to activate QMC and/or QoE reporting, and, at block 1106, the UE 102 performs QMC and/or QoE reporting in accordance with the QoE configuration (e.g., events 310, 384, and 484 of FIGS. 3A-3G and 4B-4C). In some implementations, the flow continues to block 1108, where the UE 102 transmits QoE reports to the RAN 105 in accordance with the QoE configuration (e.g., events 312, 384, and 484 of FIGS. 3A-3G and 4B-4C).

At block 1110, the UE 102 receives a QoE pause command from the RAN 105 for a QoE configuration (e.g., events 358 and 394 of FIGS. 3E-3G), and, in response, at block 1112 the UE 102 temporarily suspends QoE reporting for the QoE configuration (e.g., events 360 and 394 of FIGS. 3E-3G). At block 1114, the UE 102 detects a communication failure in communications between the UE 102 and the RAN 105 (e.g., events 316 and 416 of FIGS. 3A-4C). In response, at block 1116, the UE 102 performs a reestablishment procedure with the RAN 105 to reestablish a connection between the UE 102 and a base station of the RAN 105 (e.g., events 386, 387, and 486 of FIGS. 3A-4C).

At block 1118, the UE 102 determines whether the UE 102 receives one of (i) a QoE resume indication for the QoE configuration or (ii) a new QoE configuration updating the QoE configuration from the RAN 105 during the reestablishment procedure. If the UE 102 does receive one of the QoE resume indication or the new QoE configuration, the flow continues to block 1120 where the UE 102 resumes transmitting QoE reports for the QoE configuration (e.g., events 366 or 392 of FIGS. 3E-3G). If the UE 102 determines that the UE 102 receives neither, then the flow instead proceeds to block 1122 where the UE 102 continues to suspend QoE reporting and refrain from transmitting QoE reports for the QoE configuration.

Referring next to FIG. 12, a method 1200 can be implemented in a suitable UE and includes determining whether to suspend or continue QoE reporting in accordance with a configuration based on whether the UE receives a pause indication in the reestablishment procedure. For clarity, the method 1200 is discussed with specific reference to the RAN 105, the S-BS 104 as a source node, the T-BS 106 as a target node, the CN 110 or OAM 180 as a QoE node (e.g., a network node), and the UE 102.

At block 1202, the UE 102 communicates with a RAN 105 while operating in a connected state (e.g., events 304, 384, 404, and 484 of FIGS. 3A-4C). At block 1204, the UE 102 receives a QoE configuration from the RAN (e.g., events 308, 384, and 484 of FIGS. 3A-3G and 4B-4C). In response, the UE 102 activates QMC and/or QoE reporting and, at block 1206, performs QMC and/or QoE reporting in accordance with the QoE configuration (e.g., events 310, 384, and 484 of FIGS. 3A-3G and 4B-4C). In some implementations, the flow continues to block 1208 where the UE 102 transmits QoE reports to the RAN in accordance with the QoE configuration (e.g., events 312, 384, and 484 of FIGS. 3A-3G and 4B-4C). At block 1210, the UE 102 detects a communication failure in the communication between the UE 102 and the RAN 105 (e.g., events 316 and 416 of FIGS. 3A-4C). In response, at block 1212, the UE 102 performs a reestablishment procedure with the RAN 105 to reestablish connection between the UE 102 and a base station of the RAN 105 (e.g., events 386, 387, and 486 of FIGS. 3A-4C).

At block 1214, the UE 102 determines whether the UE 102 receives a pause indication for the QoE configuration during the reestablishment procedure (e.g., events 358 and 394 of FIGS. 3E-3G). If so, the flow continues to block 1216 where the UE suspends transmitting QoE reports for the QoE configuration (e.g., events 360 and 394 of FIGS. 3E-3G). If the UE 102 does not receive a pause indication during the reestablishment procedure, then flow continues to block 1218, where the UE 102 continues to transmit QoE reports to the RAN in accordance with the QoE configuration (e.g., events 334, 368, 392 of FIGS. 3A-B and 3E-3G).

Referring next to FIG. 13, a method 1300 can be implemented in a target node of a suitable RAN and includes managing QoE measurement collection and reporting. For clarity, the method 1300 is discussed with specific reference to the RAN 105, the S-BS 104 as a source node, the T-BS 106 as a target node, the CN 110 or OAM 180 as a QoE node (e.g., a network node), and the UE 102.

At block 1302, a target node such as the T-BS 106 receives, from the UE 102, a request to reestablish a radio connection (e.g., events 318, 386, and 486; 602; and 802, 912, 1010, 1116, and 1212 of FIGS. 3A-4C; 6; and 8-12). At block 1304, the T-BS 106 retrieves a configuration for the QoE reporting (e.g., events 320/322/323, 386, 486, 512/514, 604/606, 708/718, 804/806, 912, and 1010 of FIGS. 3A-10). At block 1306, the T-BS 106 performs at least one of: (i) facilitating, after the retrieving, reporting of QoE measurements for the UE 102 to the QoE node (e.g., events 334/336; 368/370, 392, and 434/436; 816/818; and 1012, 1120, and 1218 for FIGS. 3A-3B; 3E-4C; 8; and 10-12), or (ii) releasing the configuration (e.g., events 388, 351, 349, and 488; 616; and 914/916 of FIGS. 3A-4B; 6; and 9).

Referring next to FIG. 14, a method 1400 can be implemented in a source node of a suitable RAN and managing QoE measurement collection and reporting. For clarity, the method 1400 is discussed with specific reference to the RAN 105, the S-BS 104 as a source node, the T-BS 106 as a target node, the CN 110 or OAM 180 as a QoE node (e.g., a network node), and the UE 102.

At block 1402, a source node such as the S-BS 104 receives a configuration for the QoE (e.g., events 306, 384, 406, 484, 504, and 904 of FIGS. 3A-5 and 9). At block 1404, the S-BS 104 receives a request for a context for the UE 102 from a target node of the RAN 105, such as T-BS 106 (e.g., events 320, 386, 486, 512, 604, 708, 804, 912, and 1010 of FIGS. 3A-10). At block 1406, in response to the receiving, the S-BS 104 transmits a configuration for QoE reporting for the UE 102 to the target node (e.g., events 322, 323, 386, 486, 514, 606, 710/718, 806, 912, and 1010 of FIGS. 3A-10).

Figure 15:
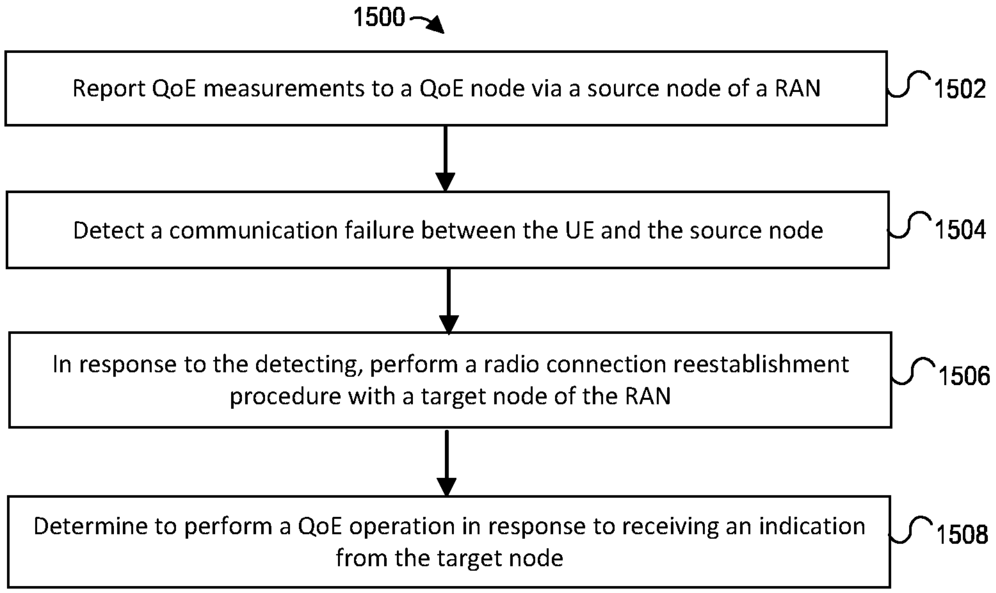
FIG. 15 is a flow diagram of an example method for managing QoE measurement collection and reporting, implemented in a UE.

Referring next to FIG. 15, a method 1500 can be implemented in a suitable UE and includes managing QoE measurement collection and reporting. For clarity, the method 1500 is discussed with specific reference to the RAN 105, the S-BS 104 as a source node, the T-BS 106 as a target node, the CN 110 or OAM 180 as a QoE node (e.g., a network node), and the UE 102.

At block 1502, the UE 102 reports QoE measurements to a QoE node such as the CN 110 or OAM 180 via a source node of a RAN 105, such as S-BS 104 (e.g., events 312, 384, 484, 510, 706, 816/818, 910, 1006, 1108, and 1208 of FIGS. 3A-5 and 7-12). At block 1504, the UE 102 detects a communication failure between the UE 102 and the source node (e.g., events 316, 416, 1114, and 1210 of FIGS. 3A-4C and 11-12). At block 1506, in response to the detecting, the UE 102 performs a radio connection reestablishment procedure with a target node of the RAN 105, such as T-BS 106 (e.g., events 386, 387, 486, 1116, and 1212 of FIGS. 3A-4C and 11-12). At block 1508, the UE 102 determines to perform a QoE operation in response to receiving an indication from the target node (e.g., events 1118 and 1214 of FIGS. 11-12).

The following list of examples reflects a variety of the embodiments explicitly contemplated by the present disclosure:

Example 1. A method for managing quality of experience (QoE) reporting for a user equipment (UE) initially configured to report QoE measurements to a QoE node via a source node of a radio access network (RAN), the method implemented in a target node of the RAN and comprising: receiving, by processing hardware and from a UE, a request to reestablish a radio connection; retrieving, by the processing hardware, a configuration for the QoE reporting; and performing at least one of: (i) facilitating, by the processing hardware and after the retrieving, reporting of QoE measurements from the UE to the QoE node, or (ii) releasing the configuration.

Example 2. The method of example 1, including: receiving a first command to modify the configuration; and transmitting, to the UE, a second command to modify the configuration.

Example 3. The method of example 1, including: receiving a first command to release the configuration; and transmitting, to the UE, a second command to release the particular configuration.

Example 4. The method of examples 2 or 3, including: receiving a reference identifier corresponding to the configuration; identifying, based on the reference identifier, the configuration from among a plurality of configurations related to the UE.

Example 5. The method of examples 2-4, including transmitting the second command in response to determining that the configuration is invalid for the target node.

Example 6. The method of example 1, including: after retrieving the configuration, releasing the configuration at the target node.

Example 7. The method of example 6, including: in response to releasing the configuration, transmitting, to the QoE node, a notification that the target node has released the configuration.

Example 8. The method of example 6, wherein: the releasing is in response to determining that the target node does not support QoE reporting.

Example 9. The method of any of examples 1-8, further comprising: determining that the QoE reporting is suspended; determining, after retrieving the configuration, to resume the QoE reporting; and transmitting a command to the UE to resume the QoE reporting.

Example 10. The method of example 9, wherein determining to resume is in response to receiving an indication from the QoE node to resume the QoE reporting.

Example 11. The method of examples 9 or 10, wherein determining that the QoE reporting is suspended includes: receiving, from the QoE node, a pause status indication.

Example 12. The method of any of examples 1-11, wherein the configuration is a first configuration, including: receiving a second configuration for QoE reporting from the QoE node; and transmitting a command to the UE to begin a new QoE reporting session using the second configuration.

Example 13. The method of any of examples 1-8, including: receiving, from the source node, an indication that the QoE reporting is suspended; and after receiving the indication that the QoE reporting is suspended, transmitting, to the UE, an indication to resume the QoE reporting.

Example 14. The method of example 13, including receiving a single message that includes both the indication that the QoE reporting is suspended and the configuration.

Example 15. The method of examples 13 or 14, wherein retrieving the configuration includes: receiving the configuration during a reestablishment procedure, wherein the indication to resume the QoE reporting is included in a radio reconfiguration message.

Example 16. The method of any of examples 1-8, wherein retrieving the configuration includes: receiving the configuration during a reestablishment procedure, the method further comprising: determining to suspend QoE reporting; and during the reestablishment procedure, transmitting, to the UE, an indication to suspend the QoE reporting.

Example 17. The method of example 16, wherein determining to suspend QoE reporting is in response to receiving, from the source node, a message including an indication to suspend QoE reporting and the configuration.

Example 18. A target base station of a radio access network (RAN) comprising processing hardware and configured to implement a method according to any of examples 1-17.

Example 19. A method for managing quality of experience (QoE) reporting for a user equipment (UE) to a QoE node, the method implemented in a source node in a radio access network (RAN) and comprising: receiving, by processing hardware, a configuration for the QoE; receiving, by the processing hardware, a request for a context for the UE from a target node of the RAN; and in response to the receiving, transmitting, by the processing hardware, a configuration for QoE reporting for the UE to the target node.

Example 20. The method of example 19, including: after transmitting the configuration to the target node, determining to release the configuration; and releasing, at the source node, the configuration.

Example 21. The method of example 20, including: in response to releasing the configuration, transmitting an indication to the QoE node that the source node has released the configuration.

Example 22. The method of any of examples 19-21, including: determining to suspend the QoE reporting; and transmitting a command to the UE to suspend the QoE reporting.

Example 23. The method of example 22, wherein: the determining to suspend is in response to receiving, from the QoE node, an indication to pause the QoE reporting.

Example 24. The method of example 22, including: transmitting, to the QoE node, an indication that QoE reporting is suspended.

Example 25. The method of any of examples 22-24, wherein transmitting the configuration further includes: transmitting, to the target node in response to receiving the request for the context, an indication that QoE reporting is suspended.

Example 26. The method of any of examples 19-25, including: receiving, from the QoE node, an indication to perform a QoE operation; attempting to transmit, in response to receiving the indication to perform the QoE operation, a radio reconfiguration command to the UE; and determining that the attempting has failed.

Example 27. The method of example 26, including: transmitting, to the QoE node, an indication that transmitting the radio reconfiguration command has failed.

Example 28. The method of examples 26 or 27, wherein the indication to perform a QoE operation is one of: (i) a command to activate QoE reporting using the configuration; (ii) a command to release the configuration; or (iii) a command to modify the configuration.

Example 29. The method of any of examples 19-28, wherein the configuration for QoE reporting is at least one configuration, including: receiving, from the QoE node, the at least one configuration and at least one reference identifier; assigning a configuration identifier for each of the at least one configuration; and in response to receiving the request for the context, transmitting, to the target node, the at least one configuration, the at least one reference identifier, and the configuration identifier for each of the at least one configuration.

Example 30. The method of any of examples 19-29, including: in response to receiving the request for the context, determining whether to transmit a pause status indication or a resume indication to the UE depending on whether the QoE reporting for the configuration is suspended.

Example 31. A source base station of a radio access network (RAN) comprising processing hardware and configured to implement a method according to any of examples 19-30.

Example 32. A method for managing quality of experience (QoE) reporting, the method implemented in a user equipment (UE) and comprising: reporting, by processing hardware, QoE measurements to a QoE node via a radio access network (RAN); detecting, by the processing hardware, a communication failure between the UE and a source node of the RAN; in response to the detecting, performing, by the processing hardware, a radio connection reestablishment procedure with a target node of the RAN; and determining, by the processing hardware, to perform a QoE operation in response to receiving an indication from the target node.

Example 33. The method of example 32, wherein determining to perform the QoE operation includes: suspending, in response to receiving a message from the RAN, QoE reporting for a first configuration for QoE reporting; and determining whether to resume QoE reporting based on whether the UE receives, during a reestablishment procedure, at least one of: (i) an indication to resume QoE reporting for the first configuration, or (ii) a second configuration for QoE reporting.

Example 34. The method of example 32, further comprising: determining whether to suspend QoE reporting based on whether the UE receives, during a reestablishment procedure, an indication to pause QoE reporting for a configuration for QoE reporting.

Example 35. A user equipment comprising processing hardware and configured to implement a method according to any of examples 32-34.

The following additional considerations apply to the foregoing discussion.

In some implementations, the reference ID can be a QoE reference ID. In other implementations, the reference ID can be a service type. In yet other implementations, the reference ID can be a CN configuration ID or an OAM configuration ID as described above. In yet other implementations, the reference ID can be a Trace ID as described above.

In some implementations, "message" is used and can be replaced by "information element (IE)". In some implementations, "IE" is used and can be replaced by "field". In some implementations, "configuration" can be replaced by "configurations" or the configuration parameters.

A user device in which the techniques of this disclosure can be implemented (e.g., the UE 102) can be any suitable device capable of wireless communications such as a smartphone, a tablet computer, a laptop computer, a mobile gaming console, a point-of-sale (POS) terminal, a health monitoring device, a drone, a camera, a media-streaming dongle or another personal media device, a wearable device such as a smartwatch, a wireless hotspot, a femtocell, or a broadband router. Further, the user device in some cases may be embedded in an electronic system such as the head unit of a vehicle or an advanced driver assistance system (ADAS). Still further, the user device can operate as an internet-of-things (IOT) device or a mobile-internet device (MID). Depending on the type, the user device can include one or more general-purpose processors, a computer-readable memory, a user interface, one or more network interfaces, one or more sensors, etc.

Certain embodiments are described in this disclosure as including logic or a number of components or modules. Modules may be software modules (e.g., code, or machine-readable instructions stored on non-transitory machine-readable medium) or hardware modules. A hardware module is a tangible unit capable of performing certain operations and may be configured or arranged in a certain manner. A hardware module can include dedicated circuitry or logic that is permanently configured (e.g., as a special-purpose processor, such as a field programmable gate array (FPGA) or an application-specific integrated circuit (ASIC), a digital signal processor (DSP)) to perform certain operations. A hardware module may also include programmable logic or circuitry (e.g., as encompassed within a general-purpose processor or other programmable processor) that is temporarily configured by software to perform certain operations. The decision to implement a hardware module in dedicated and permanently configured circuitry, or in temporarily configured circuitry (e.g., configured by software) may be driven by cost and time considerations.

When implemented in software, the techniques can be provided as part of the operating system, a library used by multiple applications, a particular software application, etc. The software can be executed by one or more general-purpose processors or one or more special-purpose processors.

Upon reading this disclosure, those of skill in the art will appreciate still additional and alternative structural and functional designs for managing radio bearers through the principles disclosed herein. Thus, while particular embodiments and applications have been illustrated and described, it is to be understood that the disclosed embodiments are not limited to the precise construction and components disclosed herein. Various modifications, changes and variations, which will be apparent to those of ordinary skill in the art, may be made in the arrangement, operation and details of the method and apparatus disclosed herein without departing from the spirit and scope defined in the appended claims.

What is claimed is:

1. A method for managing quality of experience (QoE) reporting for a user equipment (UE) that reported QoE measurements to a QoE node via a source node of a radio access network (RAN), the method being implemented in a target node of the RAN and comprising:

receiving, from a UE, a request to reestablish a RAN connection after a RAN connection failure;

retrieving a configuration for the QoE measurements; and performing at least one of: (i) reporting post-failure QoE measurements from the UE to the QoE node according to the configuration, or (ii) releasing the configuration.

2. The method of claim 1, further comprising:

determining that the QoE reporting is suspended;

determining, after retrieving the configuration, to resume the QoE reporting; and transmitting a command to the UE to resume the QoE reporting.

3. The method of claim 1, including:

receiving a reference identifier corresponding to the configuration;

identifying, based on the reference identifier, the configuration from among a plurality of configurations related to the UE.

4. The method of claim 1, including:

receiving, from the source node, an indication that the QoE reporting is suspended; and after receiving the indication that the QoE reporting is suspended, transmitting, to the UE, an indication to resume the QoE reporting.

5. The method of claim 4, including receiving a single message that includes both the indication that the QoE reporting is suspended and the configuration.

6. The method of claim 4, wherein retrieving the configuration includes:

receiving the configuration during a reestablishment procedure, wherein the indication to resume the QoE reporting is included in a radio reconfiguration message.

7. The method of claim 1, wherein retrieving the configuration includes:

receiving the configuration during a reestablishment procedure, the method further comprising:

determining to suspend QoE reporting; and during the reestablishment procedure, transmitting, to the UE, an indication to suspend the QoE reporting.

8. A method for managing quality of experience (QoE) reporting for a user equipment (UE) to a QoE node, the method being implemented in a source node in a radio access network (RAN) and comprising:

receiving a configuration for QoE measurements;

receiving a post-failure request for a context for the UE from a target node of the RAN; and in response to the receiving the post-failure request, transmitting the configuration for QoE reporting to the target node.

9. The method of claim 8, including:

after transmitting the configuration to the target node, determining to release the configuration; and releasing, at the source node, the configuration.

10. The method of claim 8, including:

determining to suspend the QoE reporting; and transmitting a command to the UE to suspend the QoE reporting.

11. The method of claim 8, including:

receiving, from the QoE node, an indication to perform a QoE operation;

attempting to transmit, in response to receiving the indication to perform the QoE operation, a radio reconfiguration command to the UE; and determining that the attempting has failed.

12. The method of claim 11, wherein the indication to perform a QoE operation is one of:

(i) a command to activate QoE reporting using the configuration;

(ii) a command to release the configuration; or (iii) a command to modify the configuration.

13. The method of claim 8, wherein the configuration for QoE measurements is at least one configuration, including:

receiving, from the QoE node, the at least one configuration and at least one reference identifier;

assigning a configuration identifier for each of the at least one configuration; and in response to receiving the request for the context, transmitting, to the target node, the at least one configuration, the at least one reference identifier, and the configuration identifier for each of the at least one configuration.

14. The method of claim 8, including:

in response to receiving the request for the context, determining whether to transmit a pause status indication or a resume indication to the UE depending on whether the QoE reporting for the configuration is suspended.

15. An apparatus, operating as a target node of a radio access network (RAN) and configured to manage quality of experience (QoE) reporting for a user equipment (UE) that reported QoE measurements to a QoE node via a source node of the, the apparatus comprising:

processing hardware configured to:

receive, from a UE, a request to reestablish a RAN connection after a RAN connection failure;

retrieve a configuration for the QoE measurements; and perform at least one of: (i) reporting post-failure QoE measurements from the UE to the QoE node according to the configuration, or (ii) releasing the configuration.

16. The apparatus of claim 15, wherein the processing hardware is further configured to: determine that the QoE reporting is suspended; determine, after retrieving the configuration, to resume the QoE reporting; and transmit a command to the UE to resume the QoE reporting.

17. The apparatus of claim 16, wherein the processing hardware is further configured to:

receive a reference identifier corresponding to the configuration; and identify, based on the reference identifier, the configuration from among a plurality of configurations related to the UE.

18. The apparatus of claim 16, wherein the processing hardware is further configured to:

receive, from the source node, an indication that the QoE reporting is suspended; and after receiving the indication that the QoE reporting is suspended, transmit, to the UE, an indication to resume the QoE reporting.

19. The apparatus of claim 18, wherein the processing hardware is further configured to:

receive a single message that includes both the indication that the QoE reporting is suspended and the configuration.

20. The apparatus of claim 18, wherein retrieving the configuration includes:

receiving the configuration during a reestablishment procedure, wherein the indication to resume the QoE reporting is included in a radio reconfiguration message.

* * * * *